(12) United States Patent
Ford et al.

(10) Patent No.: US 10,087,837 B2
(45) Date of Patent: Oct. 2, 2018

(54) PROCESS FOR TREATING WASTE FEEDSTOCK AND GASIFIER FOR SAME

(71) Applicant: IQ ENERGY INC., Spruce Grove (CA)

(72) Inventors: Darrell Ford, Spruce Grove (CA); Ken Davison, Lake Country (CA)

(*) Notice: Subject to any disclaimer, the term of this patent is extended or adjusted under 35 U.S.C. 154(b) by 382 days.

(21) Appl. No.: 14/727,707

(22) Filed: Jun. 1, 2015

(65) Prior Publication Data
US 2016/0017235 A1 Jan. 21, 2016

Related U.S. Application Data

(60) Provisional application No. 62/025,428, filed on Jul. 16, 2014.

(51) Int. Cl.
*F02C 6/18* (2006.01)
*F02C 3/22* (2006.01)
*C10K 1/04* (2006.01)
*C10B 47/34* (2006.01)
*C10B 53/00* (2006.01)
*C10B 53/02* (2006.01)

(52) U.S. Cl.
CPC ............... *F02C 3/22* (2013.01); *C10B 47/34* (2013.01); *C10B 53/00* (2013.01); *C10B 53/02* (2013.01); *C10K 1/04* (2013.01); *F05D 2220/75* (2013.01); *Y02E 50/14* (2013.01); *Y02P 20/129* (2015.11)

(58) Field of Classification Search
CPC ......... C10B 47/34; C10B 53/00; C10B 53/02; C10K 1/04; F02C 3/22; F02D 2220/75; Y02E 50/14; Y02P 20/129
See application file for complete search history.

(56) References Cited

U.S. PATENT DOCUMENTS

| | | | | |
|---|---|---|---|---|
| 3,702,039 A | * | 11/1972 | Stookey | C10G 1/02 201/25 |
| 4,280,892 A | * | 7/1981 | Havlik | C10G 1/02 201/18 |
| 5,026,403 A | * | 6/1991 | Michel-Kim | C10J 3/02 48/203 |
| 5,098,481 A | * | 3/1992 | Monlux | B09C 1/06 134/19 |
| 5,824,121 A | * | 10/1998 | Kowoll | C10J 3/86 422/205 |
| 2008/0149471 A1 | * | 6/2008 | Wolfe | C10B 47/44 201/8 |
| 2009/0020456 A1 | * | 1/2009 | Tsangaris | C10G 1/002 208/133 |

* cited by examiner

*Primary Examiner* — Jesse Bogue

(57) ABSTRACT

A process for treating a waste feedstock using a gasifier and the gasifier for same. Hot exhaust from an engine travels through a series of hollow heating plates stacked vertically within a gasifier reactor with spaces between each set of successive heating plates forming reaction zones. Each reaction zone is divided into an upper treatment area and a lower treatment area by a rotating disk. Waste material travels from an outer feed spot along the top surface of the rotating disk radially inwardly to a drop area located at the radially innermost portion where it drops to the top surface of the hollow heating plate below. The waste material is then conveyed radially outward to a chute to the next reaction zone or once fully processed to an exit from the reactor. Vapors from the waste material are drawn off each reaction zone through an outlet for further processing.

32 Claims, 19 Drawing Sheets

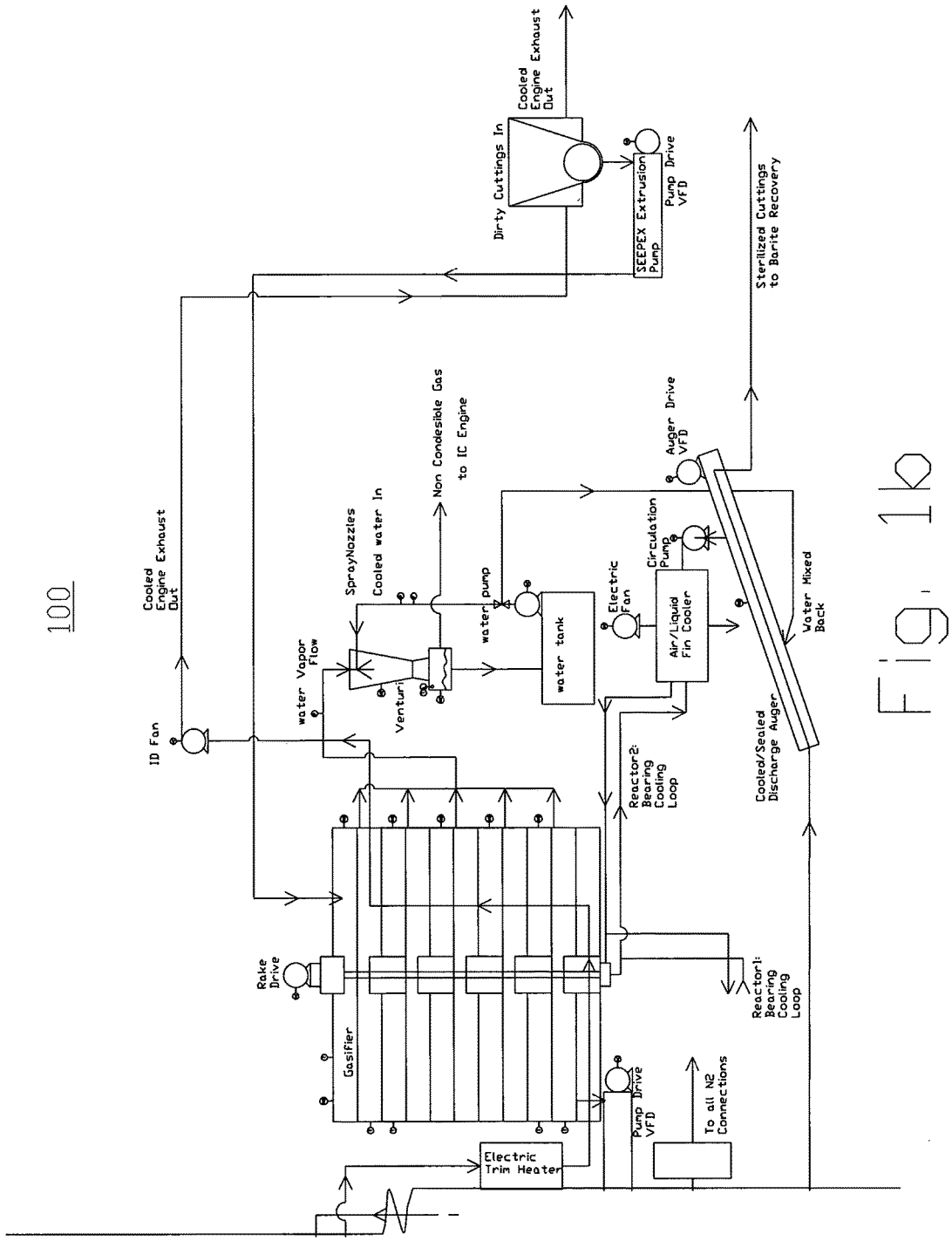

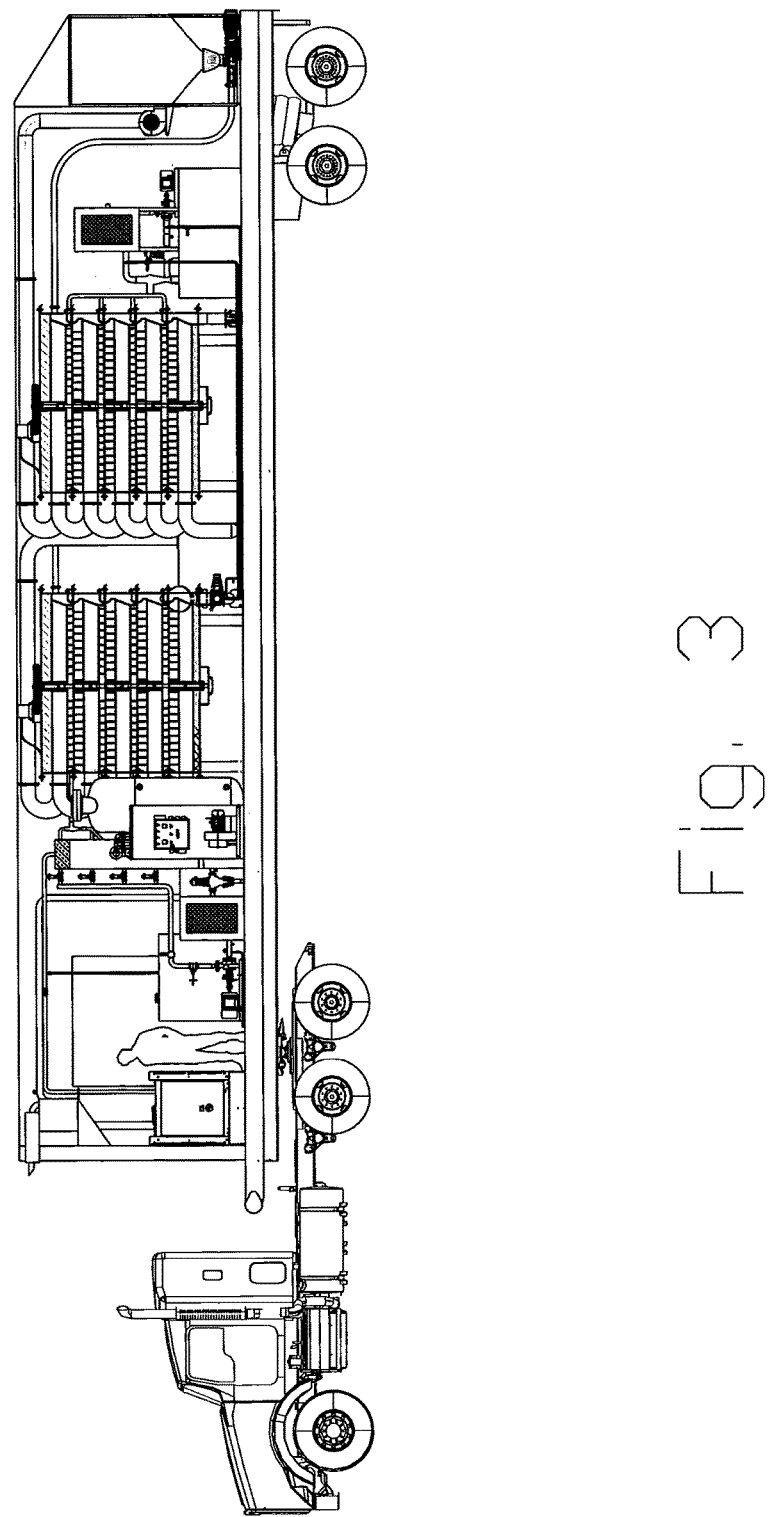

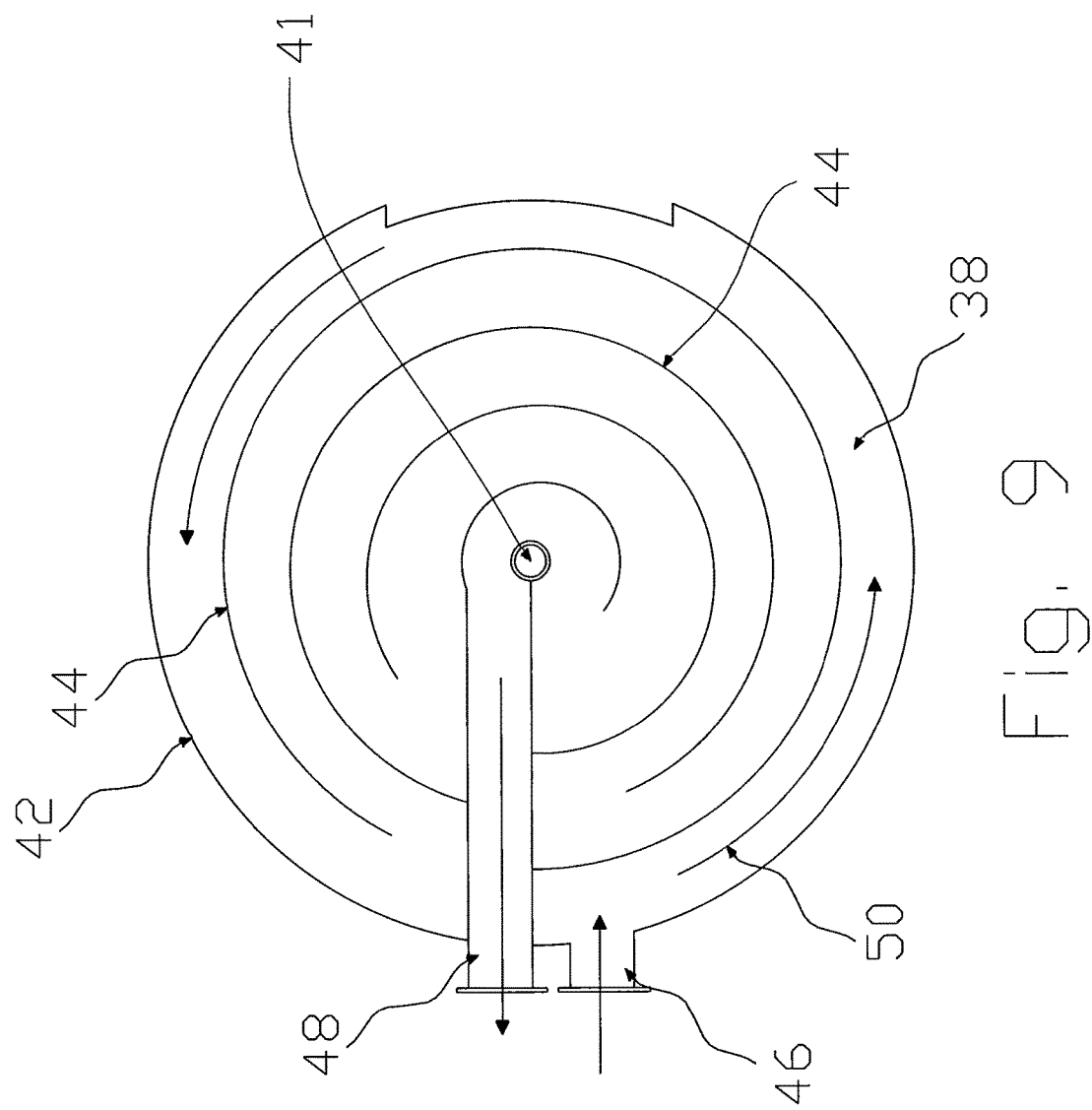

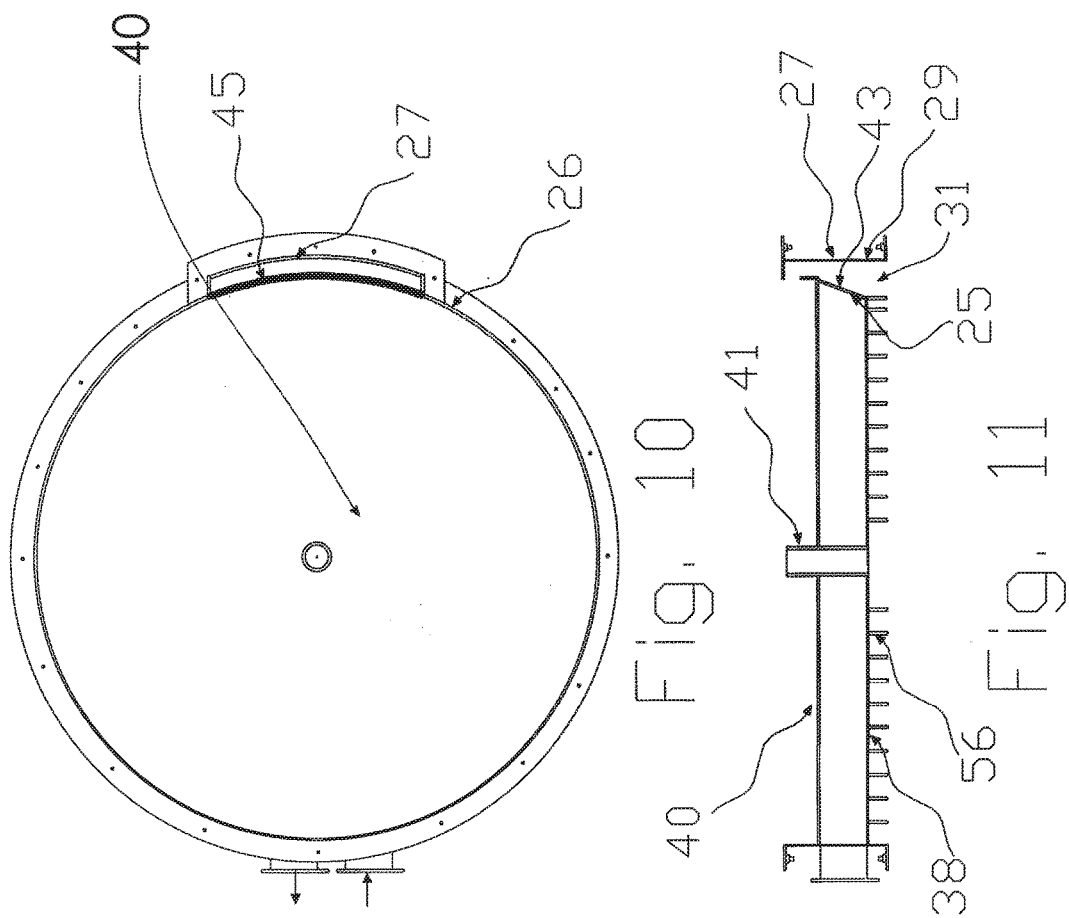

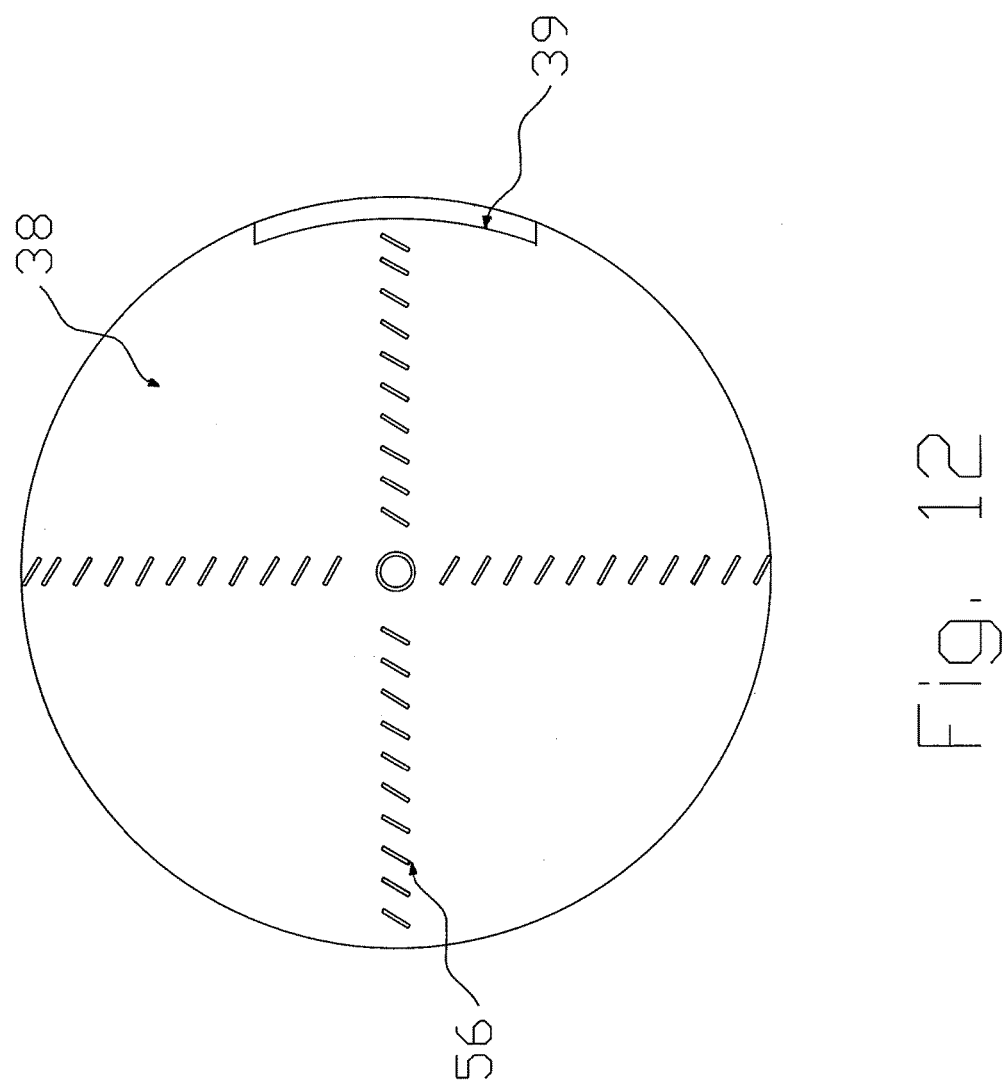

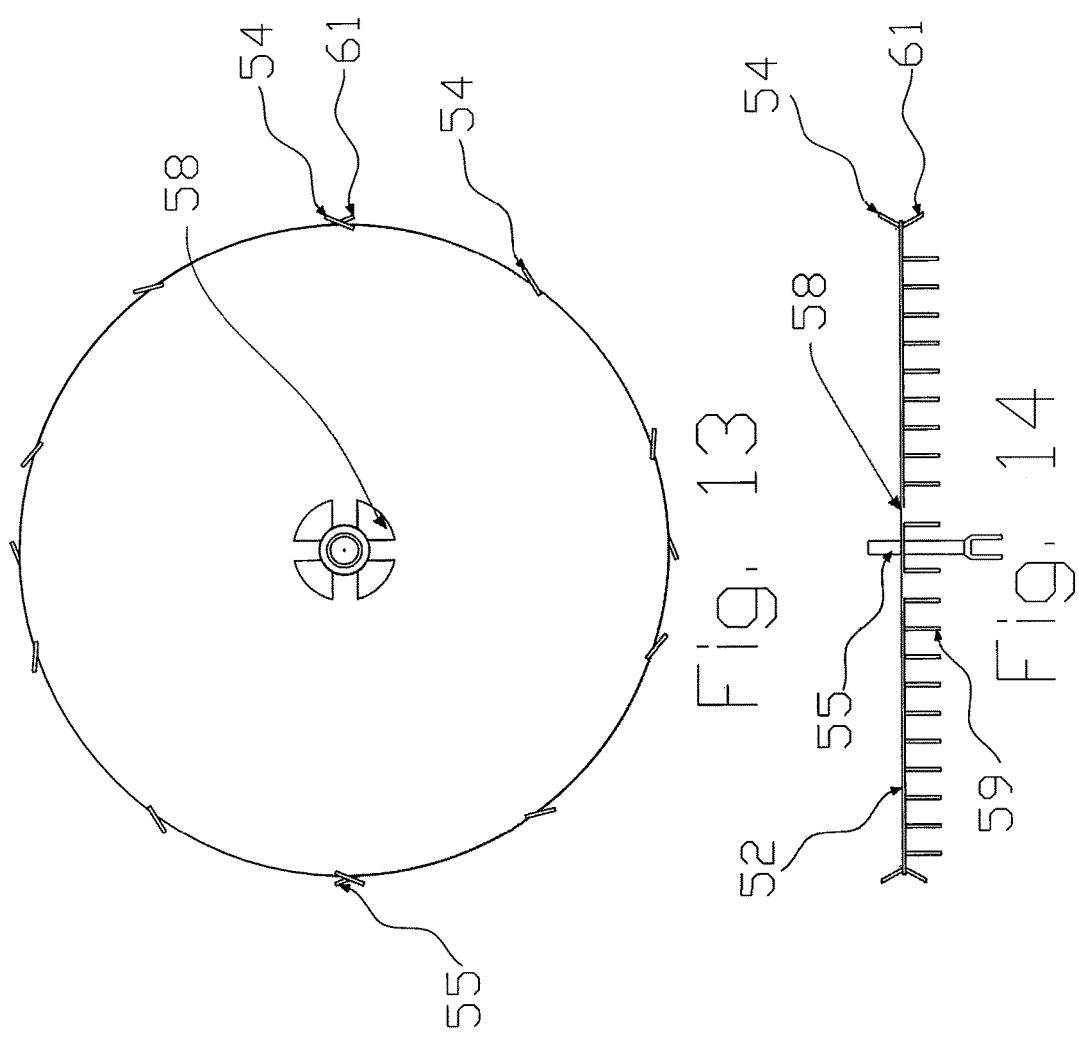

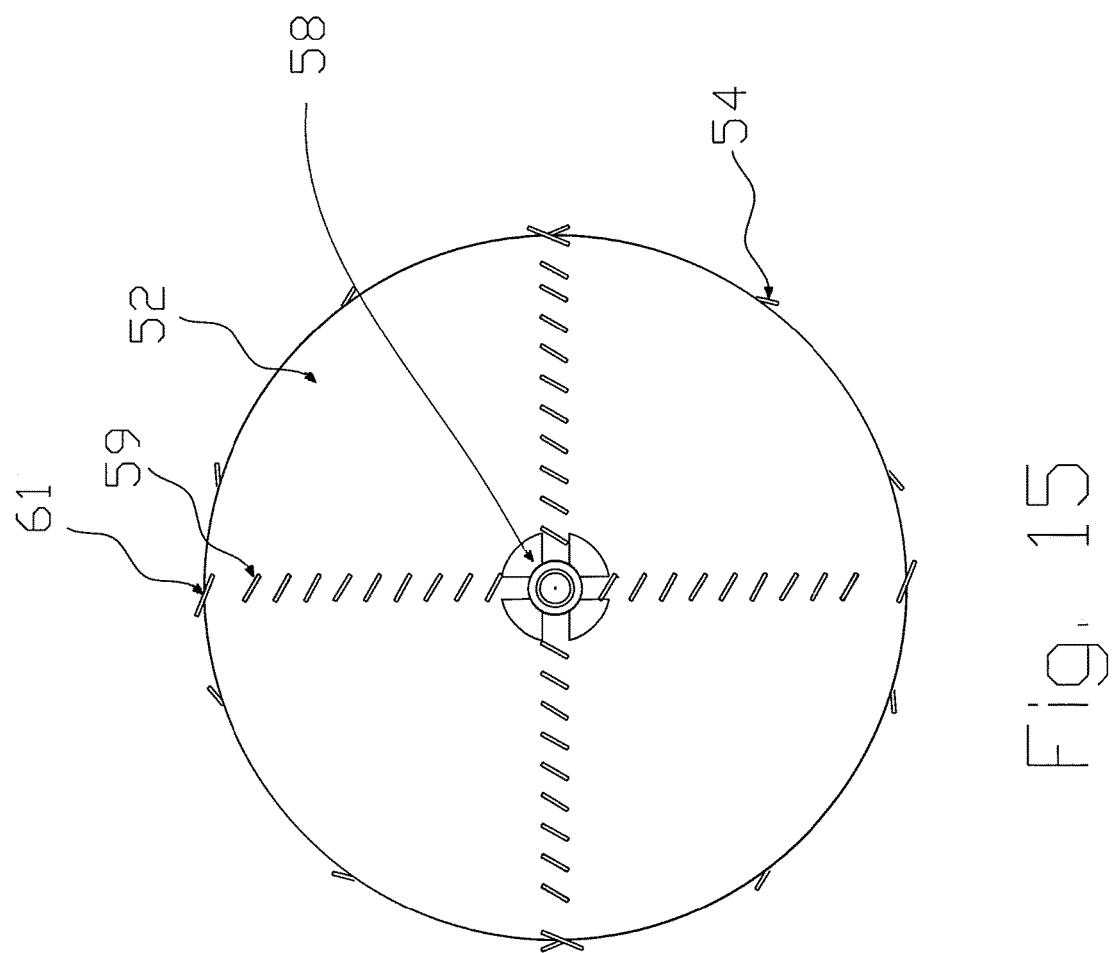

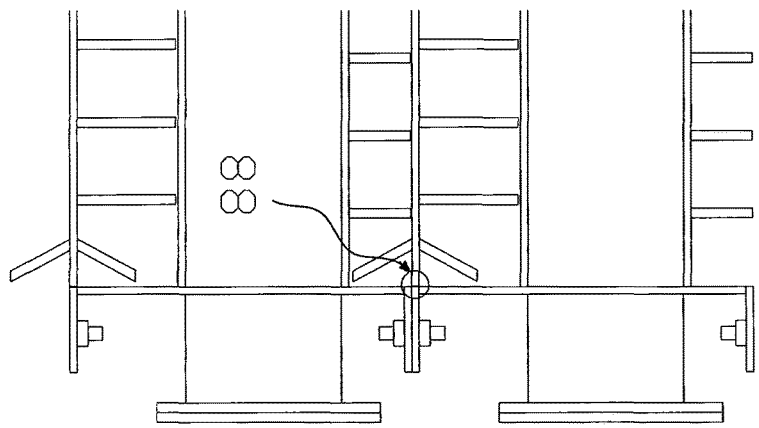
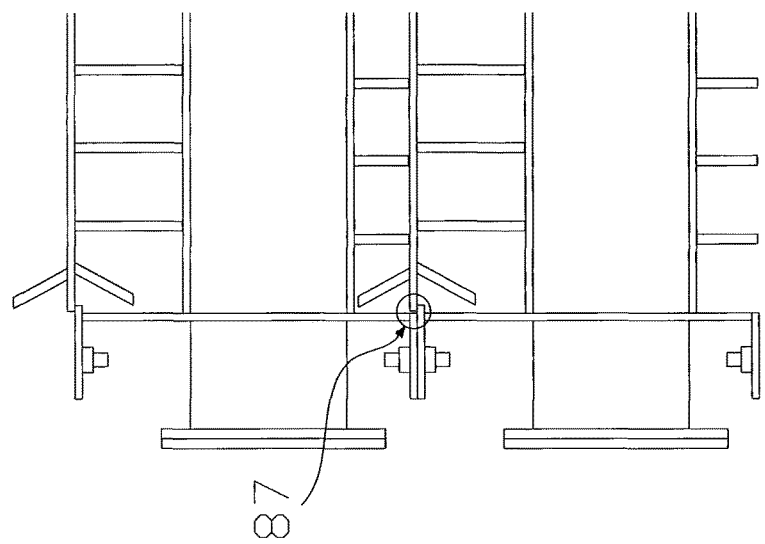
Fig. 18

US 10,087,837 B2

PROCESS FOR TREATING WASTE FEEDSTOCK AND GASIFIER FOR SAME

FIELD OF THE INVENTION

The present invention relates to a method for processing waste feedstock and a gasifier for use in the process. More particularly the present invention pertains to the field of gasification and a gasifier for use in treating carbonaceous waste, such as drill cutting waste produced in the oil and gas industry.

BACKGROUND OF THE INVENTION

As the oil and gas industry continues to search for and access new sources of fossil fuels, it produces an enormous amount of waste product requiring treatment. For example, in the process for drilling for oil, drill cuttings tainted with hydrocarbons are forced to the surface.

Currently most drill cutting waste is landfilled. This disposal method relies on the disposal of hydrocarbons in the waste material using the soils natural microbes to breakdown the oils over a period of time. The process does carry some risk as there is a possibility that some of the oils and other organic compounds can leach into the water system causing environmental and economic damage. In addition, higher molecular weight compounds breakdown at a much slower rate than some of the materials and tend to contaminate the sites over longer periods of time.

Accordingly, a number of technologies have been developed for dealing with drill cuttings or other carbonaceous feedstock such as waste from the oil sands. These include the following:

Grinding: There are some technologies that use grinding or other similar methods to convert mechanical energy to heat in order to drive off the volatiles so the remaining waste material can be landfilled. These are generally quite expensive and tend to use a lot of energy. An example of such a grinding system is taught in International Publication No. WO 2006/003400 (Garrick). Garrick teaches a reactor vessel for treating contaminated waste products, such as drill cuttings. Waste material input into the reactor is heated so as to change the phase of the contaminant so it can be removed and the treated material discharged. Heat is generated in the reactor vessel by friction between spinning flails and a grinding material (dry powder) introduced into the reactor. Alternatively, additional external heating can be provided by a heating jacket.

Land farming: By adding a number of chemicals to the landfill process, the environmental impact of some of the compounds that tend to build up in the soils and water table can be reduced. A method of turning the material is used to expose more surface area to air to accelerate the evaporation process. However releasing hydrocarbons to the air can create additional environmental issues. Furthermore, over time, some of the compounds will build up on the soils and water table with consequent environmental impact.

Thermal Desorption Systems (TDU)—High Temp/Low Temp: Most TDU plants tend to be large and centralized. In the case of high temp TDU systems, high volumes of air and an outside energy source are employed to reach temperatures adequate to vaporize the hydrocarbons. The energy from this process is sometimes used for other applications such as drying, etc. High temp TDU systems often reach temperatures well above coking/molecular change levels and are not typically able to recover hydrocarbons in a useful form. Low temperature TDU systems employ a much more controlled process using low temperature levels, around 500 F, and are able to effectively remove up to 70% of the hydrocarbons present in the cuttings. These systems are also able to recover the liquid hydrocarbons in a form that can be beneficially reused. Outside energy sources are required at a cost and therefore the plants tend to be large centralized facilities due to energy economics and the size and configuration of equipment available.

Gasification: Gasification is the production of a combustible gas from a carbonaceous feedstock. International Publication No. WO2011/142829 (Swetnam) teaches a gasifier system for decomposing organic matter such as waster rubber tires, coal, oil shale, tar sands, etc. Swetnam teaches a reaction vessel within a thermally insulated enclosure, the bottom surface of the reaction vessel being heated by burners so as to decompose waste materials within the reaction vessel. A rotating paddle is used to agitate the waste material within the reaction vessel. Exhaust gases from the waste material exit through an exit port where they can be recovered and reused. Burners are inefficient, running at approximately 3500 to 4000 F and creating hot spots and localized elevated temperatures in the processed material causing coking and cracking.

Accordingly, there is a need for a more efficient gasifier for treating waste material.

Objects of the invention will be apparent from the description that follows.

SUMMARY OF THE INVENTION

The invention consists of a method for processing waste feedstock and a gasifier for use in the process. The gasifier comprises a plurality of hollow heating plates in spaced separation from one another stacked vertically, with the space between successive heating plates forming reaction zones. The reaction zones are divided into two treatment areas by a rotating disk. The rotating disk acts to convey material in a first treatment zone from an outer feed spot towards an inner transfer point where the material falls to a second treatment zone within which the rotating disk acts to convey material from the inner transfer point towards an outer chute where it will fall to the next outer feed spot of the reaction zone below or to be conveyed elsewhere (after being fully treated).

Heat energy is provided by the exhaust from an engine or turbine, which exhaust is further heated by an electric booster to a desired input temperature before circulating through the hollow heating plates, starting at the bottom and moving upwards. Vapors from the waste material are drawn off through outlet ports in the reaction zones and taken elsewhere for processing.

In an embodiment of the invention, the invention comprises a method for processing waste feedstock comprising introducing the waste feedstock into a gasifier having a top, bottom and sides forming a sealed enclosure. Passing hot exhaust through a plurality of sealed hollow heating plates stacked vertically within the gasifier, each heating plate having a top surface and a bottom surface and an outer wall, with spaces between each set of successive heating plates forming reaction zones. Conveying the waste feedstock through the reaction zones, starting from the top of the gasifier and exiting from an exit in the bottom of the gasifier.

Wherein each reaction zone between a pair of heating plates comprising an upper treatment area and a lower treatment area, and the waste feedstock being conveyed through the upper and lower treatment areas to a next reaction zone or to the exit, and wherein vapors from the waste feedstock are drawn off through an outlet for further processing.

In another aspect of the invention, the waste feedstock enters through a sealed inlet in the top of the gasifier. The exit is a sealed exit. The waste feedstock is introduced into the gasifier and exits under oxygen free conditions and the reactions zones operate under oxygen fee conditions.

In another aspect of the invention, the vapors are drawn off from each reaction zone, each reaction zone having a respective outlet.

In another aspect of the invention, the plurality of hollow heating plates are in fluid communication with one another.

In another aspect of the invention, the exhaust first enters a lowermost one of the plurality of hollow heating plates and moves progressively upwards through successive hollow heating plates in the gasifier until exiting through an uppermost one of the plurality of hollow heating plates.

In another aspect of the invention, the upper treatment area is separated from the lower treatment area by a rotatable disk. The waste feedstock is conveyed radially inwardly in the upper treatment area and radially outwardly in the lower treatment area.

In another aspect of the invention, when in the upper treatment area, the waste material travels from an outer feed spot along a top surface of the rotating disk radially inwardly to a drop area located at a radially innermost portion of the disk where it enters the lower treatment area when it drops through the drop area to the top surface of the hollow heating plate below and is conveyed radially outwardly along the top surface of the hollow heating plate.

In another aspect of the invention, the distance between the top surface of the rotating disk and the bottom surface of the hollow heating plate above it being smaller than the distance between a bottom surface of the disk and the top surface of the hollow heating plate below it.

Other aspects of the invention include the following:
the hot exhaust is from an engine or turbine.
the vapors are processed and input as a fuel into the engine or turbine.
the engine or turbine generates electricity, the electricity powering an electric booster which heats the hot exhaust to a desired temperature prior to entering the gasifier.
temperature and level sensors are mounted within each reaction zone.
a control system monitors the temperature and level sensors and controls the input temperature of the exhaust and the residence time of the waste material.

In another embodiment, the invention comprises a gasifier for processing a waste feedstock comprising a top, a bottom, and an outer sidewall forming a sealed enclosure; a plurality of vertically stacked hollow heating plates, the hollow heating plates being in spaced separation from one another, the space between adjacent heating plates forming a reaction zone; and each reaction zone between a pair of heating plates being divided into dual treatment zones for treating the waste feedstock.

In another aspect, the gasifier further comprising a plurality of sections, each section having an outer wall and one of the plurality of hollow heating plates fixedly connected thereto, the outer walls of adjacent sections being connected together to form the outer sidewall of the gasifier.

Other aspects of embodiments of the gasifier include the following:
the hollow heating plates being in fluid communication with one another.
the dual treatment zones comprise an upper treatment zone and a lower treatment zone.
the upper and lower treatment zones being separated from one another by a rotatable disk.
the rotatable disk having a plurality of protruding scraper elements affixed to a top of the disk, the scraper elements adapted to force waste material radially inwardly from an outer circumference of the disk.
each heating plate having a top surface and a bottom surface, a plurality of directing elements being fixedly connected to the bottom surface and extending downwards towards the top of the disk and being adapted to direct the waste material radially inwardly when the disk is rotated.
a plurality of paddles or vanes being affixed to a bottom of the disk and extending downward to the top surface of the heating plate below, the paddles or vanes being adapted to direct waste material radially outwardly when the disk is rotated.
the heating plates having a top surface, a bottom surface and an outer perimeter sidewall sealingly connected thereto and defining an interior.
the heating plates having an inlet and an outlet and a defined channel travelling through the interior from the inlet to the outlet.
the defined channel being formed by a plurality of gas conduit plates extending from the top surface to the bottom surface and being welded to one of the top and bottom surfaces.
heated gas entering a first of the heating plates through the inlet, travelling through the defined channel to the outlet and travelling to a next successive heating plate.
the defined channel directs a hot exhaust gas introduced to the heating plate about the outer circumference of the interior radially inwardly.
the number of stacked plurality of sections may be altered depending on the material to be processed.
the heated gas being exhaust from an engine or turbine.
the engine or turbine generating electricity, the electricity powering an electric booster which heats the exhaust to a desired temperature prior to entering the first heating plate of the gasifier.
the outer walls of adjacent sections are connected together with a sealing element therebetween.
the sealing element comprises a high temperature gasket and sealant.
the outer walls further comprising a top flange and a bottom flange, the abutting flanges of adjacent sections being fixedly connected together, the connected flanges forming a contact area, the high temperature gasket and sealant filling the contact area between the abutting flanges.

In yet another embodiment, the invention comprises a process for treating a waste feedstock using a gasifier comprising: introducing a heat source into a gasifier to provide indirect heat to a waste feedstock; forcing the heat source through a series of sealed hollow heating plates stacked vertically within the gasifier with spaces between each set of successive heating plates forming reaction zones, each reaction zone having dual treatment areas; introducing a waste feedstock into the gasifier through a sealed inlet in a top of the gasifier; the waste feedstock being conveyed downward through the dual treatment areas of successive reaction zones to a sealed exit located at a bottom of the gasifier; and vapors from the waste feedstock exiting the gasifier through an outlet.

Other aspects of embodiments of the invention process include the following:

the heat source being hot exhaust from an engine or a turbine or other waste heat source, or produced vapors from the gasifier that are subjected to mechanical vapour recompression, all of which may be further heated using an electric element trim feature to control the temperature of the heat source.

the vapors from the waste feedstock being drawn off each reaction zone.

a rotating disk in each reaction zone forming the dual treatment areas.

the dual treatment areas comprising an upper treatment area above the disk and a lower treatment area below the disk.

the upper treatment area being shallower than the lower treatment area.

when in the upper treatment area, the waste material travels from an outer feed spot along the top surface of the rotating disk radially inwardly to a drop area located at the radially innermost portion where it drops to the top surface of the hollow heating plate below thereby entering the lower treatment area.

when in the lower treatment area, the waste material being conveyed radially outwardly to a chute to the next reaction zone or once fully processed to the exit.

the heat source enters the lowermost of the heating plates and travels upwards through successive heating plates thereby travelling counterflow to the direction of travel of the waste material.

the heat source traveling through the heating plate from an outer circumference radially inwardly, counterflow to the direction of travel of the waste material on the top surface of the heating plate.

further comprising a second gasifier, the heat source exiting the heating plates of the gasifier and being directed to the second gasifier.

prior to entering the second gasifier, the heat source being heated to a desired temperature.

the heat source being heated by an electric booster.

the waste material introduced into the gasifier being delivered from an exit from the second gasifier.

further comprising a storage container for storing the waste feedstock, the storage container having a double wall through which the heat source is directed upon exiting the second gasifier.

further comprising a feed system for delivering the waste feedstock from the storage container to the second gasifier under oxygen free conditions.

The foregoing was intended as a broad summary only and of only some of the aspects of the invention. It was not intended to define the limits or requirements of the invention. Other aspects of the invention will be appreciated by reference to the detailed description of the preferred embodiment and to the claims.

BRIEF DESCRIPTION OF THE DRAWINGS

These and other features of the invention will become more apparent from the following description in which reference is made to the appended drawings and wherein:

FIG. 1b is an enlarged version of the right half of the process flow diagram shown in FIG. 1.

FIG. 3 is a side view of the mobile gasifier system shown in FIG. 2b shown mounted on a flat bed trailer for transport to a given location.

FIG. 9 is a top view of the bottom plate of a hollow heating plate of a gasifier reactor showing a possible arrangement for the interior walls and channels.

FIG. 10 is a top view of a hollow heating plate of a gasifier reactor showing the top plate of the hollow heating plate positioned within the reactor.

FIG. 11 is a sectional side view of a hollow heating plate of a gasifier according to the invention.

FIG. 12 is a bottom view of a hollow heating plate of a gasifier reactor showing an arrangement of paddles on the underside.

FIG. 13 is a top view of a rotating disk for use in the reaction zone between two hollow heating plates of a gasifier according to the invention.

FIG. 14 is a sectional view of the rotating disk of FIG. 13.

FIG. 15 is a bottom view of the rotating disk of FIG. 13.

FIG. 18 is a sectional view showing two ways of mounting the rotating disk in relation to the heating plate, with one embodiment shown on the left and the other embodiment on the right.

DESCRIPTION OF THE PREFERRED EMBODIMENTS

Figure 1:
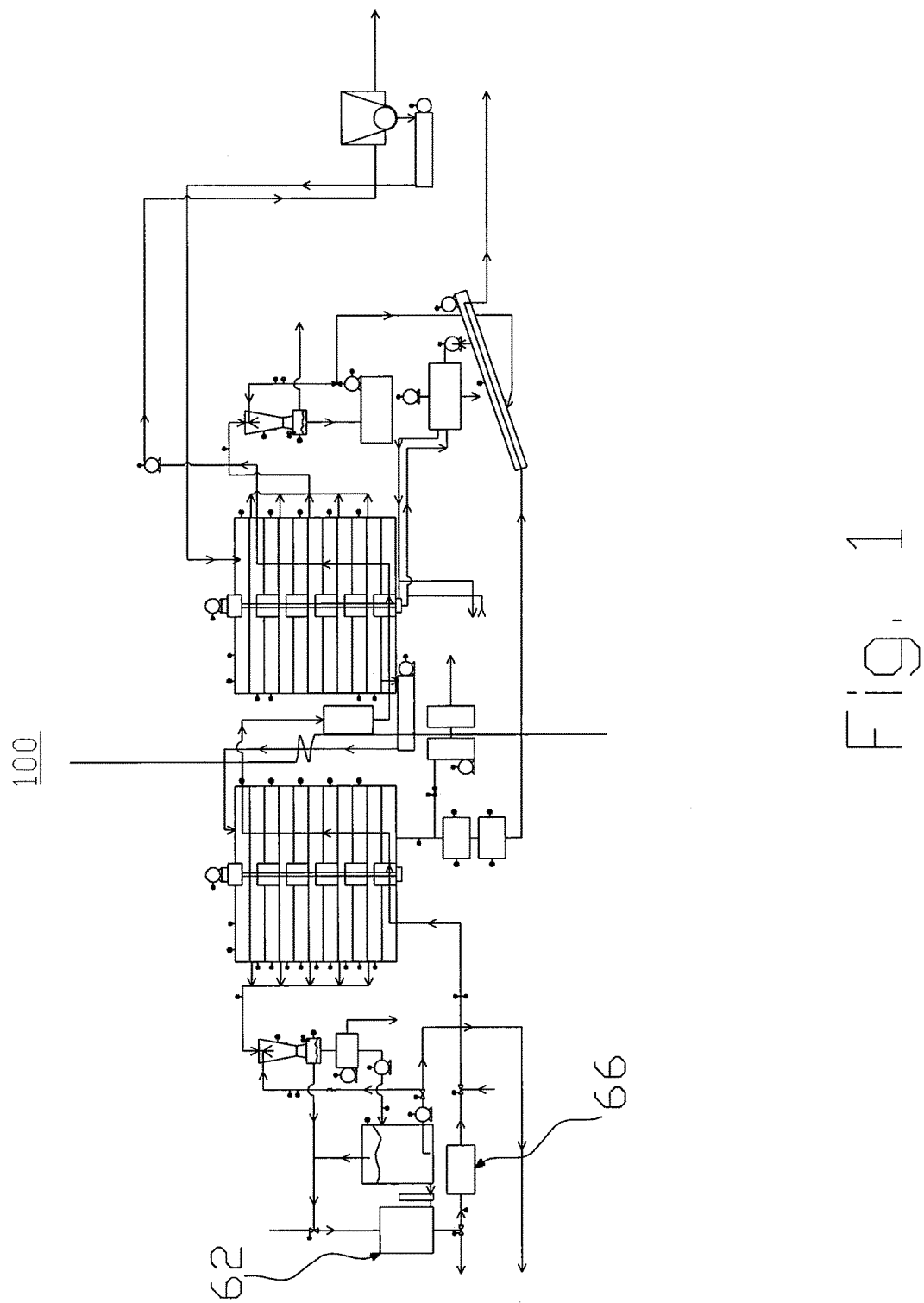
FIG. 1 is a process flow diagram of a gasifier system for treating waste feedstock according to the present invention.
Figure 1A:
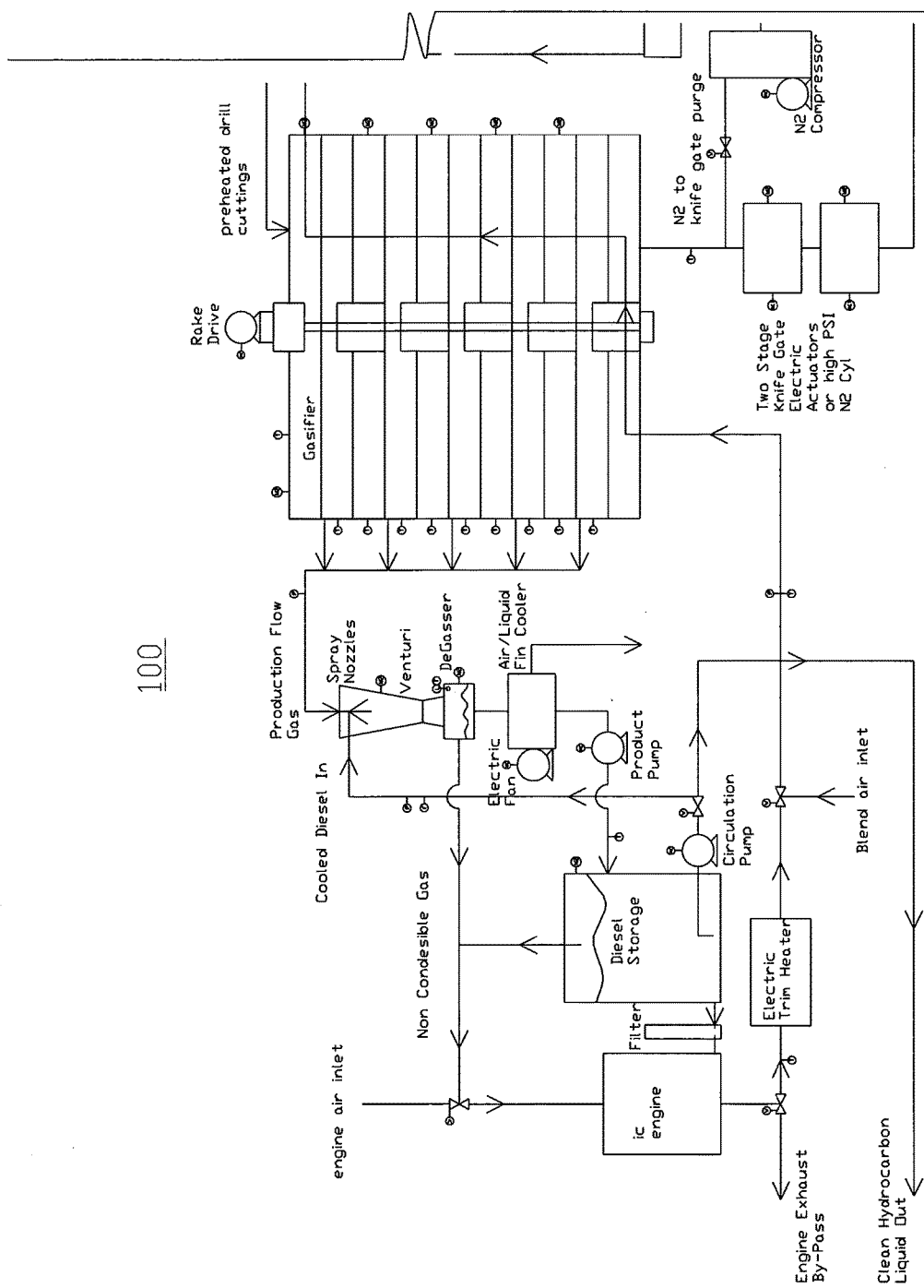
FIG. 1a is an enlarged version of the left half of the process flow diagram shown in FIG. 1.

The preferred embodiment of a gasifier system 100 for use in treating a waste material feedstock is shown in FIG. 1. The system may be used to process any organic based substance that would experience a phase change (solid to vapor) when heated up to 1400 F. More specifically, the system may be used to process hydrocarbons, animal byproducts, garbage, crop waste, various fuel crops, bitumen, bitumen tailings, tank bottoms, etc.

In the gasification process the waste materials 3 being treated are exposed to suitable and finely controlled levels of temperature and retention time to effectively achieve vaporization of all organics (hydrocarbons or other) while staying below temperatures at which coking or molecular changes occur in the volatiles being removed. For the purposes of the description below, waste material 3 will be drill cuttings or tank bottoms and the temperatures discussed will relate to the treatment of same. The hydrocarbon vapors, having been separated from all other non-organic materials (barite, rock, sand etc) forming the drill cuttings, are then recovered and reused either by being directed straight into the inlet of an engine 62, for example an internal combustion (IC) or turbine engine for power production, or by being condensed for use as liquid fuel in engine 62, or as a liquid to be used in the drilling industry. The processed non-organic waste material can then undergo further processing as necessary; for example, barite removal as discussed below.

Figure 2A:
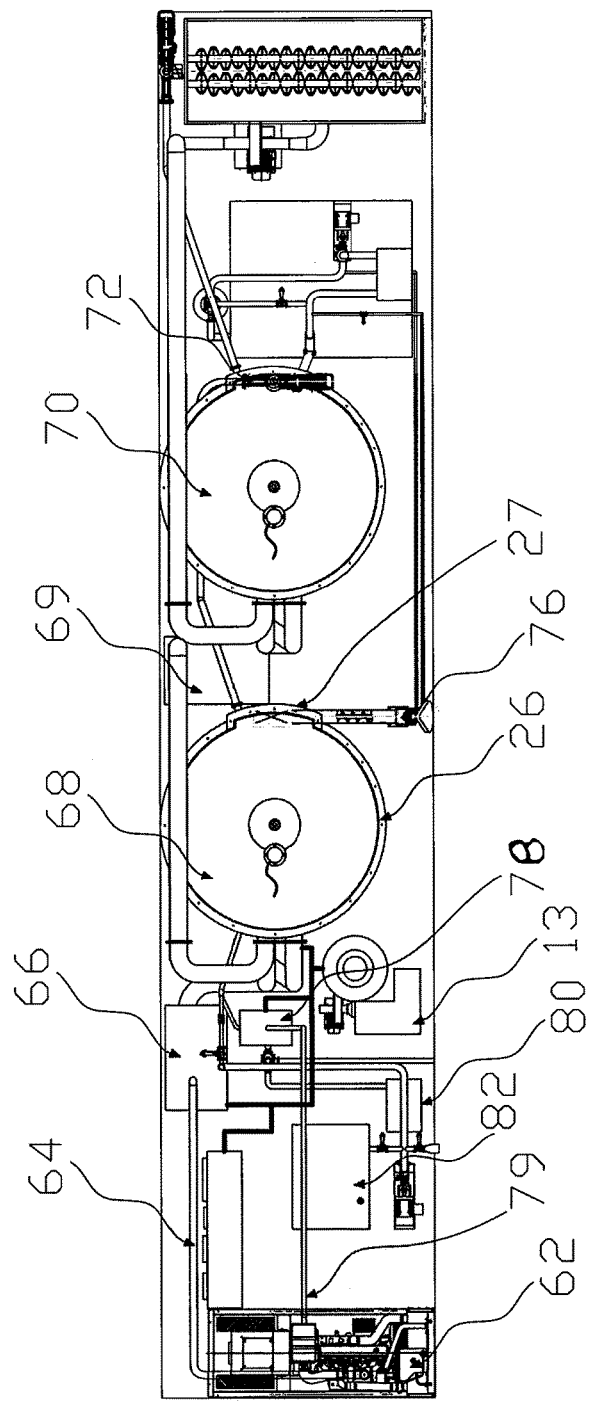
FIG. 2a is a top view of a mobile gasifier system according to the present invention taken with the roof of the mobile structure removed to show the components located within the interior.
Figure 2B:
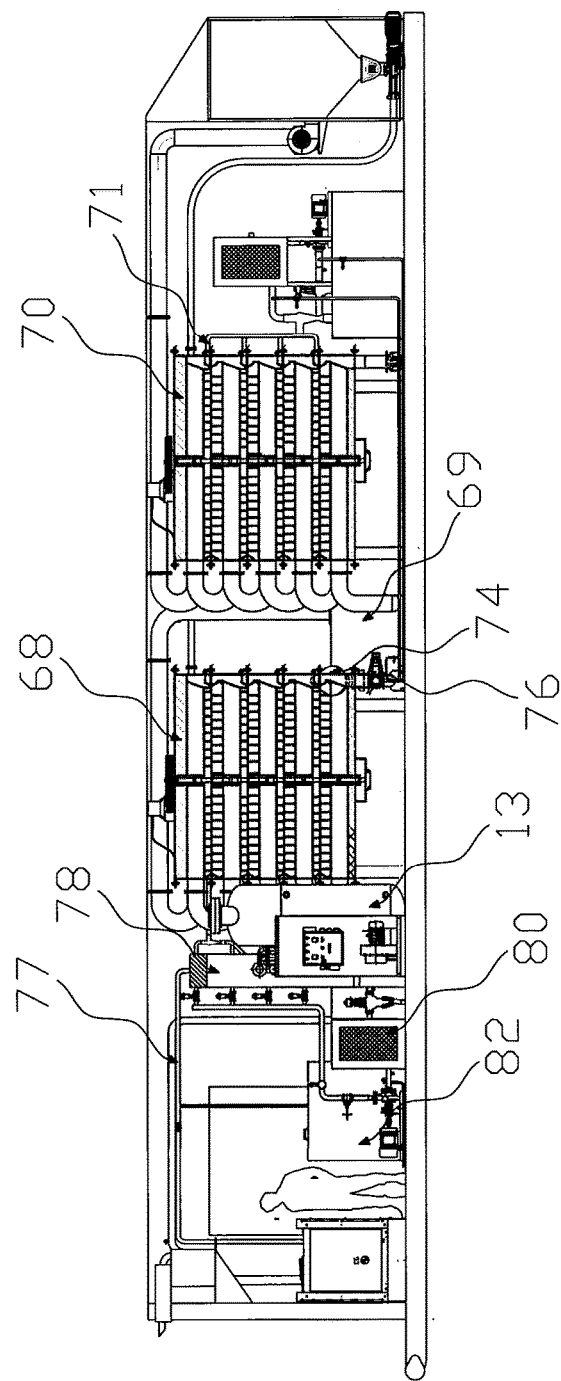
FIG. 2b is a side view of the mobile gasifier system shown in FIG. 2a with the sidewall removed to show the components located within the interior.
Figure 4:
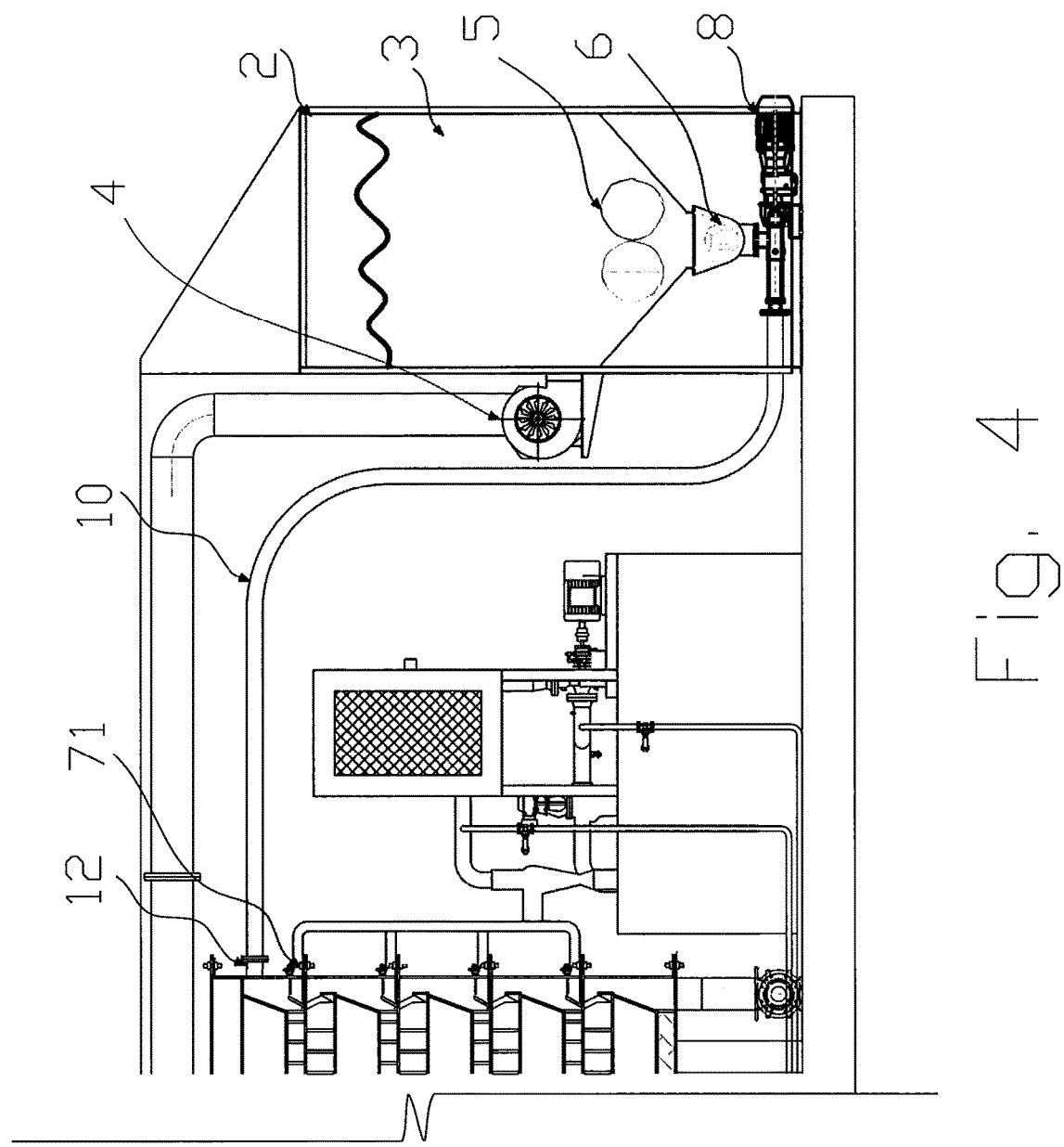
FIG. 4 is a side view showing an in-feed portion of the mobile gasifier system shown in FIG. 2b (the far right quarter of FIG. 2b).

As shown in FIGS. 2a, 2b, and 4, a storage container or in-feed hopper 2 is used to store waste material 3 to be processed. The waste material may be placed into the in-feed hopper using various kinds of pumps or mobile machines, such as a loader, or other known systems. A conveying system such as a pair of augers 5 acts to mix and convey the waste material 3 towards a feed screw 6. Other systems such as a single auger or a drag floor or the like could also be used. Alternatively, the waste material 3 could be conveyed or pumped from a secondary containment unit or directly from the source of the waste material for processing. Preferably, the storage container 2 has a double wall between which exhaust gases exiting from the final gasifier reaction zone are forced by fan 4. The exhaust gases travel from bottom to top thereby passing along any residual heat energy to the storage container and the waste materials therein, raising their temperature prior to processing and using available heat energy to maximum efficiency.

Figure 6:
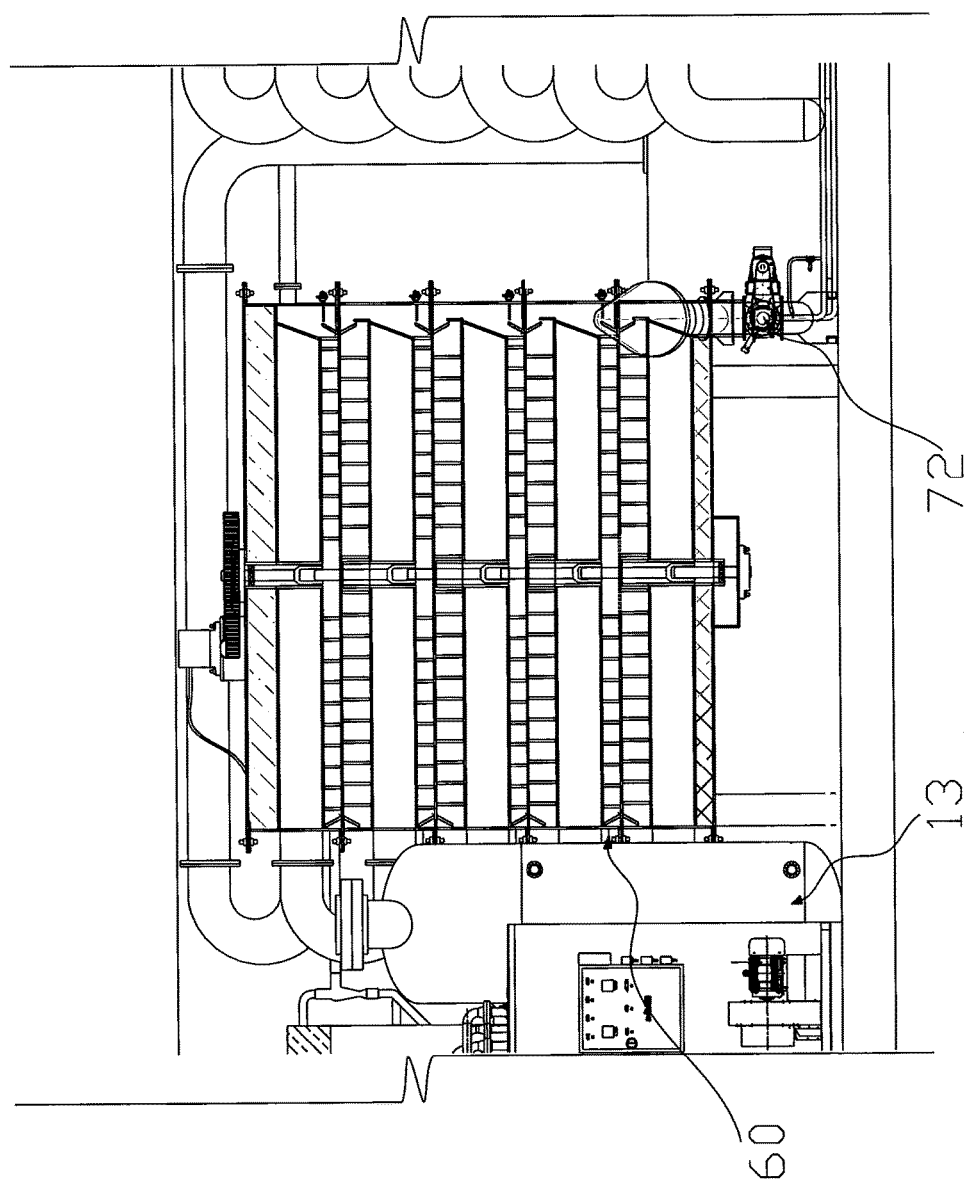
FIG. 6 is a side view showing a second gasifier reactor of the mobile gasifier system shown in FIG. 2b (the reactor on the left in FIG. 2b).

Waste material 3 exits the bottom of storage container 2 through feed screw 6 into high pressure extrusion equipment 8 (or other means to transfer the waste material to the gasifier as known in the art; such as a drag conveyor, augers etc), which forces the waste material through conduit 10 to inlet 12 and into a first gasification chamber 68. An example of suitable high pressure extrusion equipment is that commercially available from companies such as SEEPEX GMBH or a commercially available cement pump or an extrusion press (which would be used in the case of Municipal Solid Waste (MSW) pellets). The key requirement of the conveyance system is to provide fine volume and flow control while delivering the waste materials to the inlet 12 of the reactor under oxygen free conditions. Preferably, the conveyance system is also backed by a N2 blanketing system 13 (shown in FIGS. 2a, 2b and 6) as known in the art.

Figure 8:
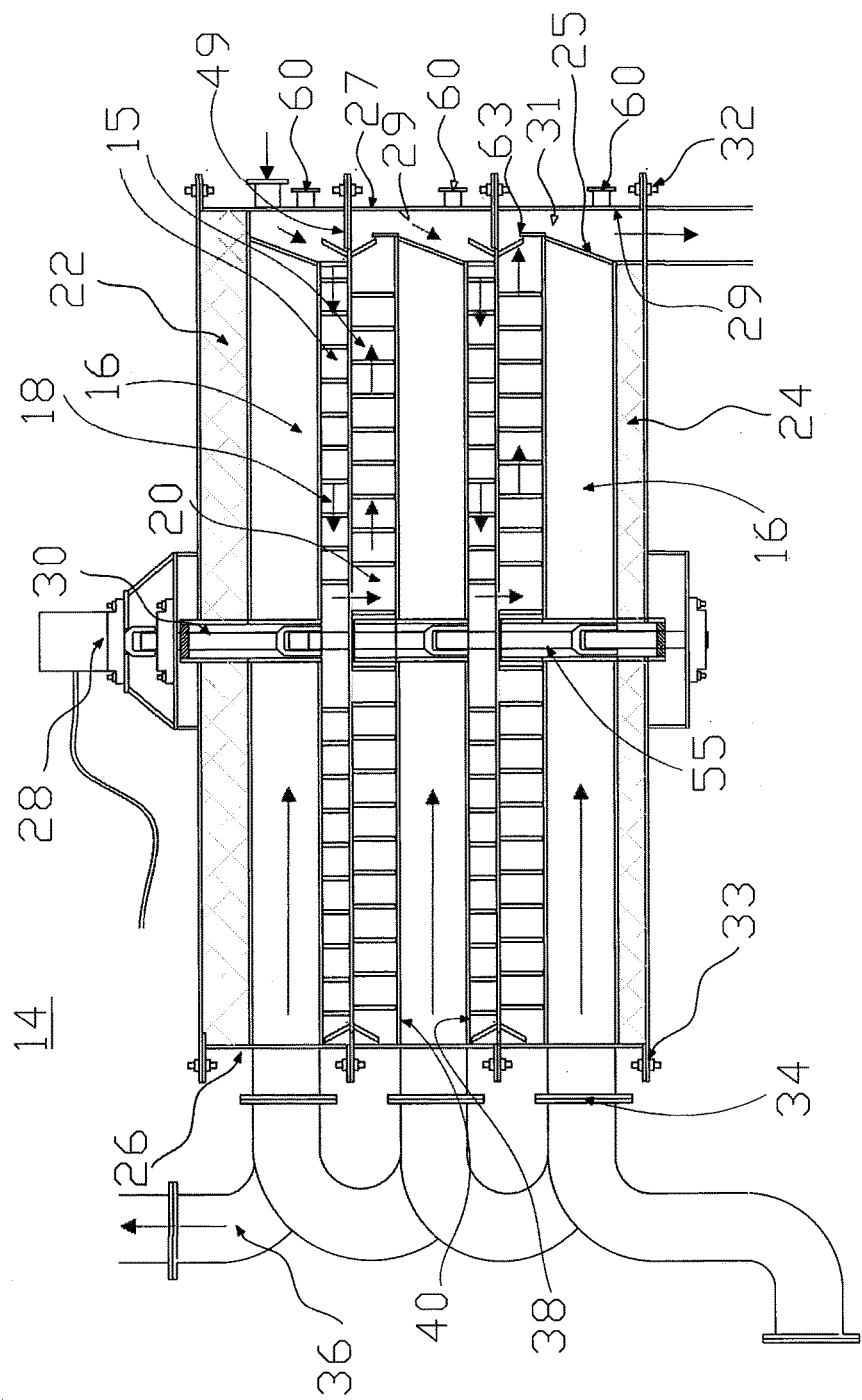
FIG. 8 is a side view of a gasifier reactor showing the interior components in section.
Figure 16:
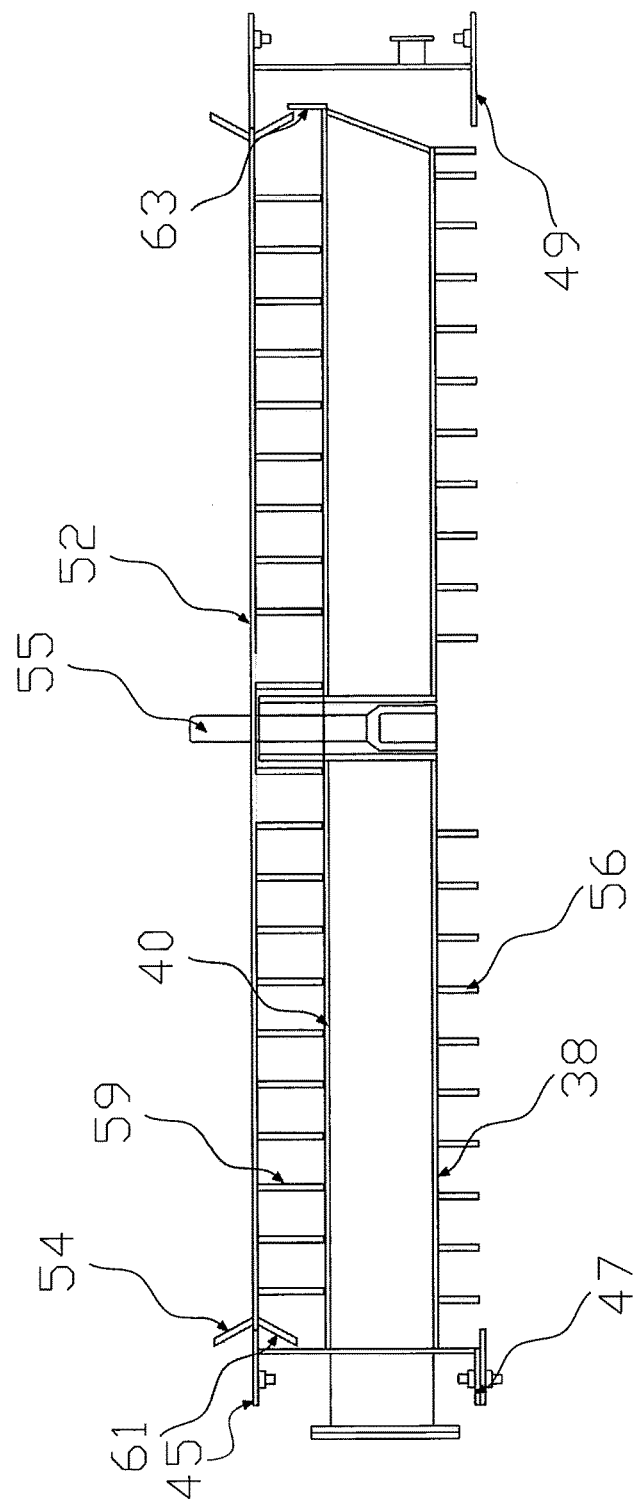
FIG. 16 is a sectional view of a hollow heating plate with a rotating disk mounted thereon.
Figure 17:
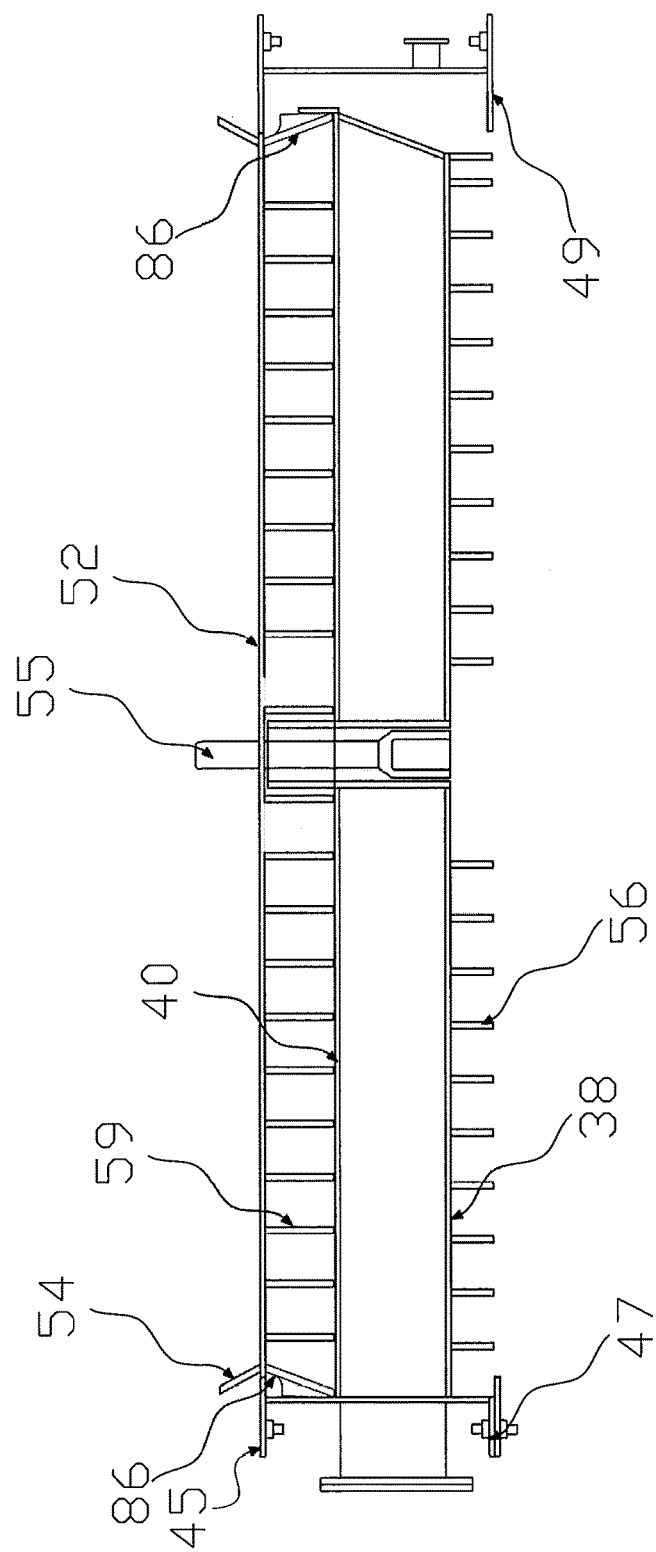
FIG. 17 is a sectional view of a hollow heating plate with a rotating disk mounted thereon similar to FIG. 16, but showing an alternative outer ejection blade configuration on the rotating disk

An example of a gasifier reactor 14 according to the invention is shown in FIG. 8, with further aspects being illustrated in FIGS. 9-18. The gasification chamber 14 is a uniquely designed system that passes the organic waste materials 3 (drilling cuttings, etc) through a series of heated reaction zones 15 separated by hollow heating plates 16. The reaction zones are preferably in the form of dual treatment zones—upper treatment zone 18 and lower treatment zone 20—as discussed in more detail below. The gasifier 14 is preferably substantially cylindrical, having a top insulated layer 22, a bottom insulated layer 24 and a 'stack' of sections that may be bolted 32 or otherwise connected together to form a sealed enclosure. Each stack has a substantially cylindrical outer wall 26 that has an outwardly extending portion 27 defining the outerwall 29 of a material transfer channel within the gasifier. Each section of outer wall 26 has a top flange 45 and bottom flange 47 welded thereto, as best seen in FIGS. 16 and 17. The top flange 45 extends radially inward from outer wall a distance so as to define a circular opening within which a rotating disk 52 (described below) is fitted. In the area of the outwardly extending portion 27, the bottom flange has an inwardly extending portion forming a platform 49. Platform 49 corresponds in size and shape to the corresponding portion of the top flange (i.e. its inner edge has an arc corresponding to the circle defined by the top flange). Sections are sealed via the use of a high temperature gasket and sealant being inserted around the total circumference and for the full width of the contact area 33 between the top 45 and bottom 48 flanges. Once all the various components are connected, an insulation layer (not shown) is added to the outside of wall 26 as known in the art.

The number of sections can be altered as needed for a given project and depending on the materials to be processed and the temperatures required for processing. For example, FIG. 8 shows a gasifier 14 having three heating plates and two reaction zones, whereas FIG. 2b shows gasifier reactors 68, 70 each having five heating plates and four reaction zones. Indirect heat is provided by heated exhaust gas entering through inlet 34 and travelling through the hollow heating plates 16, starting at the plate 16 located at the bottom of the gasifier and travelling upwards to each successive plate 16 until exiting at the top through exhaust gas outlet 36. Accordingly, the bottom of the gasifier is the hottest, with the temperature dropping for each successive reaction zone up to the top, which is the coolest.

As shown in FIGS. 9-11, each hollow heating plate (also referred to as a flue gas conduit plate) 16 is preferably formed of a substantially cylindrical bottom plate 38, a cylindrical top plate 40, an inner side wall 41 and an outer side wall 42 that are all welded together to form a sealed unit to ensure there is no mixing of the hot flue (exhaust) gas with the vapors coming off the heated process (waste) materials. The hollow heating plate 16 is seal welded in place within its section of cylindrical outer wall 26. The heating plate 16 is pressure tested to ensure it is properly sealed. Inner side wall 41 defines a cylindrical channel through which the drive shaft for the unit extends as discussed below. The bottom plate 38 has a recessed arcuate portion 39, with outer side wall 42 having a corresponding portion 43 such that in this area of heating plate 16, outer side wall 42 extends at an angle from the outer circumference of top plate 40 to the recessed arcuate portion 39 of bottom plate 38 so as to define the inner wall 25 of material transfer channel 31, with platform 49 forming the base. For those heating plates 16 that will have a reaction zone 15 located below, bottom surface 38 has a plurality of angled blades 56 connected thereto, preferably steel plates welded to bottom surface 38, or other suitable high wear material that is resistant to abrasion.

Within each hollow heating plate is a plurality of spiral-shaped gas conduit plates 44, welded either to bottom surface 38 or top surface 40, defining a channel or circuitous path through which the exhaust gases must travel from inlet 46 to outlet 48. While only being welded to one of the surfaces, the conduit plates are preferably sized to extend fully between the top and bottom surfaces such that they are in contact with the surface opposite the one they are welded to so as to define the channel through which the exhaust gas must travel. As shown in FIG. 9, the circuitous path, the direction of travel of the hot gas being shown by arrow 50, preferably travels a circular route about the outer circumference of the plate 16, with each successive circular path reversing direction and moving radially inward towards the innermost portion (inner side wall 41) of plate 16 before exiting through outlet 48 and travelling to the next heating plate or elsewhere in the system. Heat energy from the exhaust gas acts to heat the top plate 40 and bottom plate 38 of the heating plate 16, which in turn transfer heat energy to the reaction zones above the top surface 40 and below the bottom surface 38, respectively. This path from the outer circumference radially inward is preferred, as it provides the greatest temperature delta between the material being reacted in the reaction zones and the hot gasses circulating through the heated plates 16. It is also contemplated that other pathways could be used; for example, a circular pathway working its way from inside to outside with each reversal of direction or other suitable path. For the present embodiment, the channels are preferably approximately 20 cm wide and 23 cm high (8 inches by 9 inches). To build larger 'stacks', the channel would be increased in depth in order to allow more mass flow and energy transfer from top to bottom while minimizing the pressure drop through the channels. The thickness of the metal is also of some importance, as expansion concerns must be addressed; for example, ½ inch plate to expand lineally the same as ¼ inch plate. Therefore as a system is being designed, thermal FEA testing is performed to make sure that the section welds will stand up over time as the various expansion factors are considered.

The reaction zones 15 are preferably divided into an upper treatment zone 18 and a lower treatment zone 20, the treatment zones 18, 20 being separated by a rotating treatment disk 52 that is seated in the space between a pair of successive flue gas conduit plates 16 within the circle defined by top flange 45 (preferably with a gap of no more than approximately 3 mm between the outer edge of the disk and the inner edge of the flange). Alternatively, the rotating disk 52 could be sized to have a diameter slightly larger than the circle defined by the inwardly extending portion of top flange 45 such that it can be seated on top with a gap 87 as shown in the embodiment on the left in FIG. 18. Preferably the rotating disk extends about 3-6 mm over the flange and is about 3 mm from the outer wall 26, with the gap being a separation of less than 3 mm, thereby effectively forming a seal and preventing material from falling through. A further version is shown on the right side of FIG. 18, with no inwardly extending portion of top flange 45 (or bottom flange 47), except in the area of outwardly extending portion 27, where a portion of the top flange must extend inwardly in order to form a circle (see the embodiment shown in FIG. 11). For this embodiment, the rotating disk has a diameter slightly smaller than that of outer wall 26 so that the gap 88 shown in FIG. 18 is no more than 3 mm.

As shown in the figures, the upper treatment zone is preferably shallower than the lower treatment zone (ie. the height between the disk 52 and the bottom 38 of the heating plate 16 above it is smaller than the height of the disk 52 above the top 40 of the heating plate 16 below it). Limiting the distance between the disk 52 and the heating plate 16 above it results in the waste material traveling along the disk being in closer proximity to the bottom 38 of the heating plate and the heat it is radiating.

An exhaust port 60 is located in each upper treatment zone 18. Volatized gasses are drawn out through the exhaust port 60 from each of the upper treatment zones 18 for further processing. The reaction zones 15 are preferably equipped with temperature and vacuum sensors, which are monitored by a Programmable Logic Controller ("PLC") as discussed in more detail below.

Disk 52 is rotatable about a central axis by a drive shaft 30 driven by a motor 28. Preferably the motor is located at the top of the reactor, with the drive shaft seated on a large thrust bearing 35 at the bottom; however, it is understood that this arrangement could be reversed as necessary to accommodate different gasifier stack configurations and sizes. The drive shaft could also be equipped with a motor at each end. Preferably, the drive shaft is made up of a plurality of nesting shafts 55 (see FIGS. 8 and 14), with a nesting shaft 55 connected to each disk 52 and seatable on the shaft of a section below. This stack approach effectively transfers all weight of the rotating disks to a large bottom thrust bearing and allows for the precision placement of the rotating disk within the circle defined by the top flange 45 of a given section. This design also ensures support of each rotating disk thereby ensuring that the rotating vanes ride very close to the floor but avoid contact.

As shown in FIGS. 13-14, the top of the disk 52 has a plurality of protruding scraper elements 54 affixed thereto, preferably by welding. The scraper elements project inwards from the outer circumference of the disk and are set on an angle so as to act to force material away from the outer edge of the disk and into contact with a plurality of directing elements such as angled blades 56 welded to the bottom of the bottom surface 38 of the next conduit plate (located above it) which in turn act to agitate and direct material rotating about on the rotating disk 52 towards a plurality of transfer holes 58 located at the inner circumference of the disk. Upon reaching the transfer holes 58, the waste materials falls through landing on the top surface of the top plate 40 of the heating plate 16 located below. The angles of the scraper elements 54 and angled blades 56 may vary based on the physical characteristics of materials being processed. The angles may range from 10 to 45 degrees depending on the material. For example, drill cuttings are dense and therefore the angle of the scraper elements 54 and blades 56 must be quite shallow, such as a 10-20 degree angle so as to avoid 'plowing' the material. In the case of a material such as pelletized MSW, the material is light and therefore the angle can be more acute with the scraper elements or vanes spaced further apart. Any substance that is more fluid such as an application where the system is primarily dealing with a liquid throughout the process can make use of the more extreme 45 degree angle; for example when dealing with a Brine concentration where the substance does not turn to a solid phase until the bottom section.

The bottom of the disk 52 has a plurality of rotating paddles or vanes 59 affixed thereto for agitating and directing the material to be processed in a desired direction along the top plate 40, in this case radially outward towards material transfer channel 31 where it drops down to the upper treatment zone of the next reaction zone or to the waste removal system. The paddles 59 extend downwards and are sized so that their bottom most edge is adjacent to the top plate of the flue gas conduit plate below, preferably within a few millimeters. The paddles 59 are designed to transport the material at an appropriate rate so as to provide the maximum amount of residence time in contact with the top 40 of the hollow heating plate 16 but moving fast enough to all the over flow required at max design capacity. The angle of the paddles is set depending on the type of material to be processed (similar considerations as set out above in relation to blades 56). Preferably, a series of outermost ejection paddles 61 are also at a slight angle to the vertical as well as being angled to the tangent of the disk. Ejection paddles 61 are preferably sized so as to correspond to the height of the retention barrier 63 (as best viewed in FIG. 16).

The function of the outermost paddles 61 is to 'scoop' the material from the outer circumference of the top plate 40 and over the retention barrier 63 and down to the next level below. By placing the ejection paddle 61 at the height of the retention barrier 63, only that material above the level set by the barrier 63 is sent to the level below. Alternatively, as shown in FIG. 17, an alternative ejection blade 86 extends down to the level of the top surface 40 of the heating plate 16 and has a trailing edge angled outward to be in contact with the outer circumference of outer wall 26. Ejection blade 86 acts to eject material right from the base plate ensuring that there is no material left stuck along the bottom most edge. It is also contemplated that other ejection paddle/blade configurations would be suitable for ejecting material to the level below.

As shown in FIG. 12 and FIG. 15, the blades 56 and paddles 59 are shown arranged in a series of 4 radially extending columns, with the radial positions of the individual blades 56 and paddles 59 being staggered with each successive column. It is contemplated that for both the blades 56 and paddles 59, different patterns and arrangements could be used provided the conveying means acts to move the waste material in the desired direction.

This system of having dual treatment zones results in doubling of the retention time as waste material 3 is first directed inwards along the rotating disk 52 where it is heated by a combination of conduction (the directing elements 56 being heated by conduction through their connection to the bottom surface 38 of the conduit plate 16) and convection (the bottom surface of the conduit plate), before dropping through the transfer holes 58 where it is heated once again through convection and conduction (this time in direct contact with the top surface heated conduit plate) and forced outwards where it is directed to outflow (material transfer) channel 31 (either to drop through to the level below or to be transferred away after processing). Retention time can be controlled by altering the speed of rotation of disk 52.

Waste materials 3 enter gasification chamber 14 through inlet 12 located at the top of the gasifier and are moved downward through the various levels to the bottom by way of the conveying system (the various rotating disks 52 discussed above). The conveying system causes the material to systematically travel across the dual reaction zones in a counterflow movement—moving across the top of each disk 52 to the center and then, after dropping down to surface of the heating plate 16 below, moving from the centre to the outside edge and then exiting to the next layer moving progressively downward in this counterflow pattern in the reaction chamber until reaching the bottom at which point it can either be transferred to an additional gasifier for further processing or removed.

Preferably, those plates in the upper portion of the gasifier chamber will be made of carbon steel as this portion will run in the lower temperatures. The plates in the lower portion of the gasifier are subjected to higher temperatures, so are preferably made of stainless steel. The number of plates used in a 'system' can be increased or decreased as required to bring a desired amount of material through-put to a target temperature for the various levels of the gasifier; for example, for drill cuttings the target temperatures for the various reaction zones of the gasifier would range from top to bottom from about 100 to 760 C (200 F-1400 F). Heated exhaust gas enters at inlet 34 at the bottom of the gasifier as shown in FIG. 8, so this is the hottest part of the process. As the exhaust gasses travel through successive heating plates 16 progressively moving up through the gasifier, it continues to transfer heat energy and as this energy is transferred the hot gasses become cooler, the result being that the greatest temperature delta possible is maintained between the material temperatures and the hot gasses resulting in the material becoming hotter as it moves downward and the gasses becoming cooler as they move upward—counterflow. In this fashion, materials working their way from the top of the gasifier to the bottom lose their volatile hydrocarbons with the shorter chains coming off at the higher (cooler) levels and the longer hydrocarbon chains coming off at the lower levels where the temperatures are higher. For example, in the case of C60, the vaporization temp is 615 C, so it would remain with the material being processed until the lower level of the gasifier.

The present gasifier system increases the temperatures gradually thereby releasing the carbon chains at the correct temperatures. IE: shorter chains come off higher up in the chamber, and longer chains come in the lower sections where the temps are higher. With the preferred temperature range, all of the hydrocarbons are volatized without cracking or coking. The vapors are continuously vacuumed from each reaction chamber through gas exhaust ports 60 and are then collected and condensed back into liquids or, alternatively, left as hot gasses (in the case of other feed-stocks such as manure or pelletized MSW) and are sent directly to an energy conversion system—IE.: engine 62. Preferably, each section of the gasifier has its own gas exhaust port 60 through which the vaporized hydrocarbons are withdrawn for further processing/use.

Figure 7:
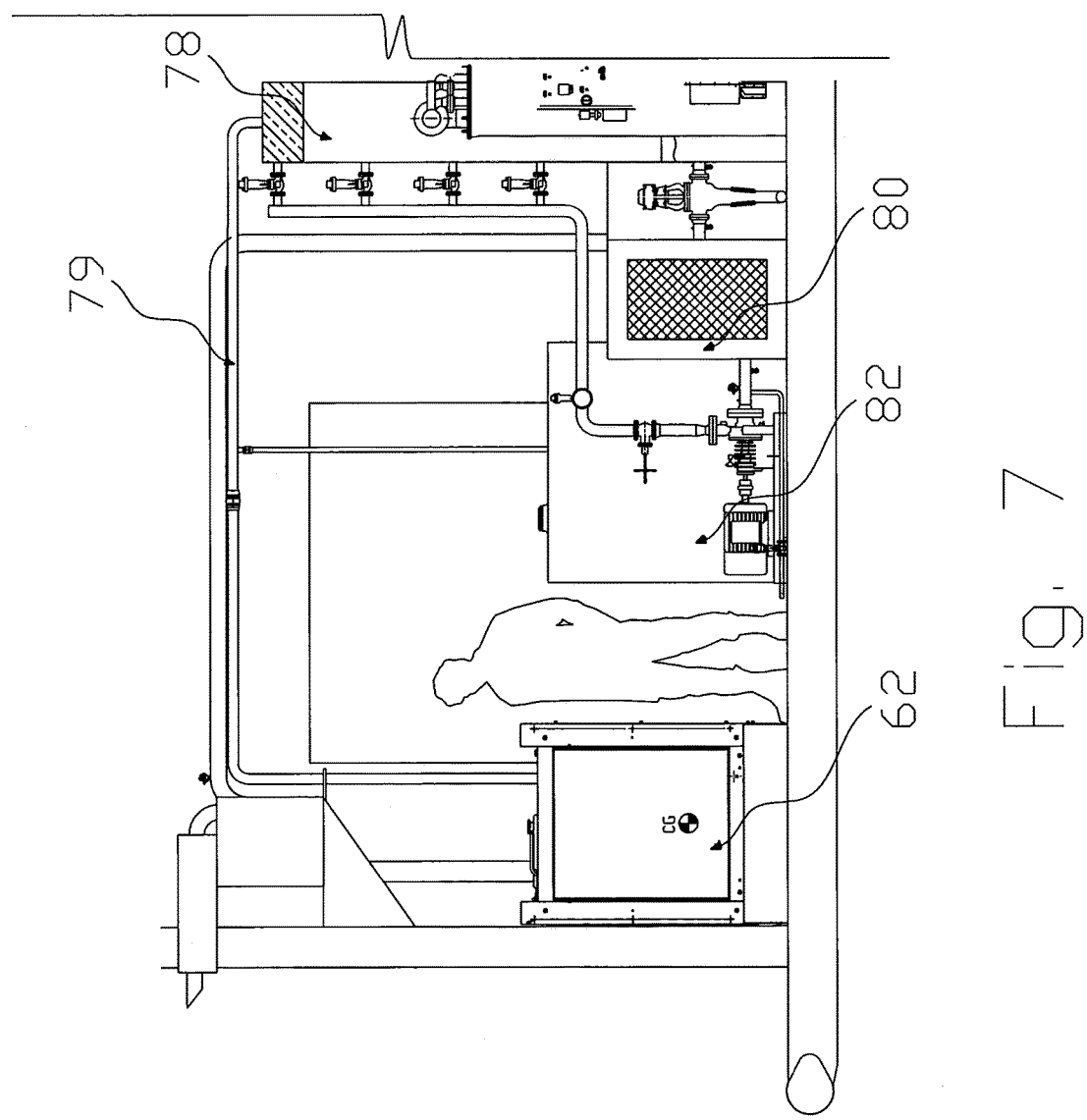
FIG. 7 is a side view showing a hydrocarbon purification unit and power source for the mobile gasifier system shown in FIG. 2b (the far left quarter of FIG. 2b).

The gasification reaction is endothermic and requires large amounts of heat energy to be supplied into the process in order to volatize the feed-stock. The required heat energy for the process is supplied by waste heat coming from the integrated energy conversion system 62—which in the embodiment shown is specifically an IC Engine driving an electric generator. The IC engine produces significant exhaust flows at temperatures between 490 and 650° C. and ranging from 40 or 50% or higher of the total energy input (from diesel or gasoline or NG)—energy that would typically be wasted to the atmosphere under normal power generation applications. Instead, in the present design, as shown in FIGS. 2a, 2b and 7, the exhaust flow 64 is directed into an electric temperature booster 66 which brings the exhaust gases to the desired input temperature before the exhaust flow enters the gasifier and travels through the hollow heating plates 16 as discussed above, thereby transferring the heat energy needed for the gasification reaction. As this hot engine exhaust 64 moves upward in the chamber, it cools due to the transfer of its heat energy to the plates 16 and then indirectly to the material being processed. Moving upward the exhaust gasses eventually exit the unit at the top section having cooled to an approximate temperature in the 93-121 C (200-250 F) range. The exhaust gases can then be directed to the in-feed hopper as discussed above.

Alternatively, in a smaller reactor, such as reactor 68 shown in FIGS. 2a and 2b, the exhaust gasses come off reactor 68 at higher temperatures (say 204-315 C or 4-600 F) and goes through an additional electric booster 69 and then into the second reactor 70 for additional oil removal and/or for water removal at the top of this second reactor 70 stack. This could be repeated in multiple stacks to increase production, say for example on a stationary site. This flue gas exit and temperature 'reboost' is required to maintain the higher temperature deltas needed for vaporization of the organics in each subsequent stack. It is a key part of the present system that it can remove water separately from the oils by utilizing one or more sections located in the front end of the process—as 'Water removal' sections. These sections are run hot enough to vaporize water but cool enough to not release any hydrocarbons—IE: below 148 C (300 F). This also allows flue gas to finally exit at very low temps—65-121 C (150-250 F) using up a very high percentage of the energy in the stream, and increased efficiency. The exhaust gasses exiting from the final reaction chamber 70 preferably travel through a conduit to the infeed storage container 2 where the heat energy is utilized to pre-heat the incoming solids before being finally exhausted to the atmosphere.

Figure 5:
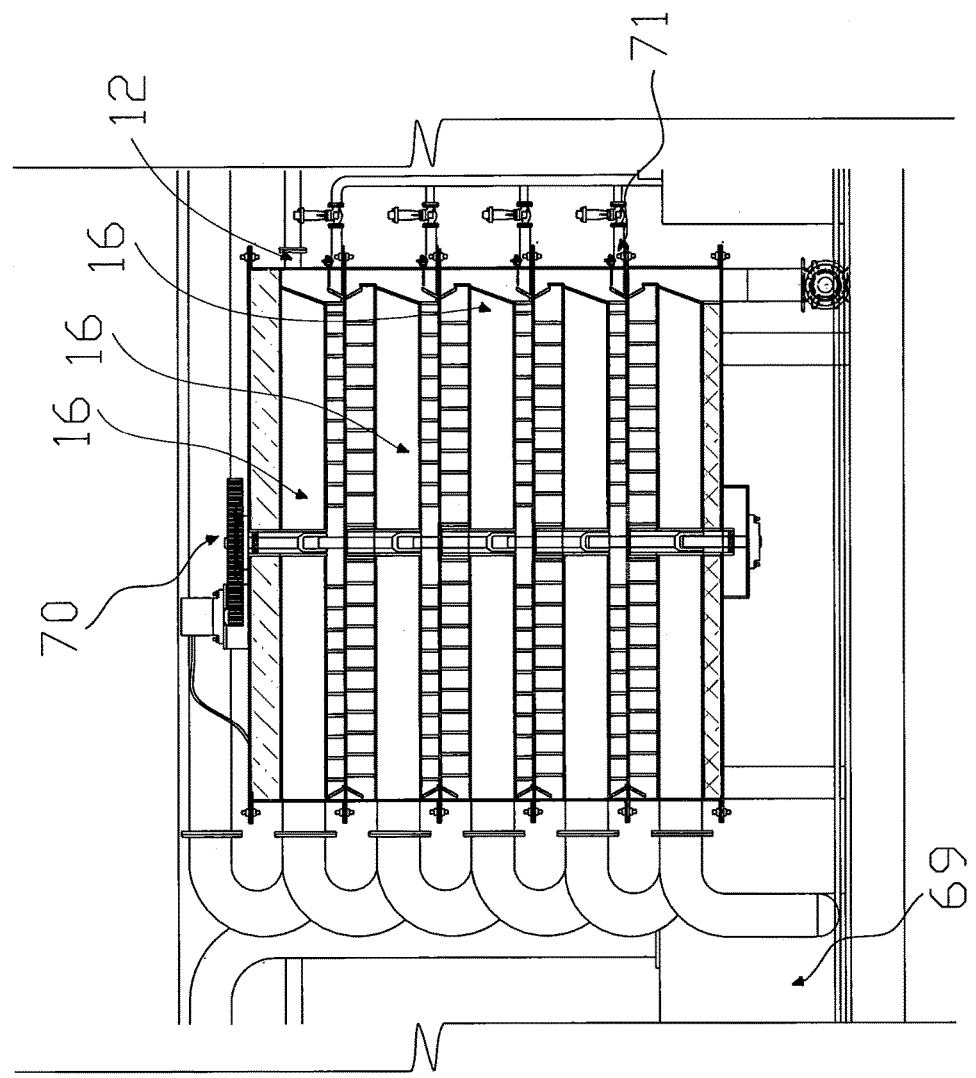
FIG. 5 is a side view showing a first gasifier reactor of the mobile gasifier system shown in FIG. 2b (the reactor on the right in FIG. 2b).

With the illustrated two reactor system, the waste material first enters gasifier 70, with water being removed in the upper sections of the reactor and drawn off through the exhaust ports 60. Once in the lower sections (after all water removed), hydrocarbons begin to volatize and are drawn off. Preferably, each upper treatment zone of the reaction zones of gasifier 70 are equipped with two ports. While not shown, preferably the gasifier reactors are fabricated with dual ports for each section; however the sections will only be plumbed to allow flows in two directions (ie. through the two ports) if the application warrants the split (in other words for use when their could be either water vapor or organic volatiles that will need to be dealt with: one port 60 (see FIG. 6) connecting to the hydrocarbon recovery side (or vapors straight into the engine) and a second port 71 (see FIGS. 4 and 5) connecting to the water recovery side. Depending on the temperature profile of each reaction zone 15 one of the two ports would be opened allowing gasses therein to flow to the proper side. IE: 148 C (300 F) and below =water side; 148 C and above=hydrocarbon or gas side.

At the bottom of the second reactor 70, the waste material exits the reactor and is forced through an extrusion pump 72 or other means to main reactor 68 where the remaining hydrocarbons are volatized and drawn off through the hydrocarbon exhaust ports 60 of each reaction zone for further processing. The processed waste material is then further processed as discussed below.

Sensors (temperature, vacuum, etc.) located throughout the gasifier are all connected to the system PLC which monitors various inputs from the various sensors and based on its program, the PLC sends outputs to control all aspects of the process—amount of material being pumped in; speed and direction of the rotating disks; speed of fans to maintain certain parameters such as flow, pressure and temperature. For example: the amount of material coming into the unit is throttled by controlling the speed of the pump. The outlet temperature is the determining input to the PLC: if the temperature of the final processed waste material coming out drops below a certain level, the rotating disks 52 will slow down or stop or reverse as needed and the pump 8 will slow down or stop as needed. Once the outlet temperature hits the pre-programmed target, the disks 52 will begin rotating slowly and will increase or throttle based on this outlet temp. On the vapor side, the negative draw or vacuum is monitored by the PLC via a number of vacuum sensors. The vacuum is supplied (in one case) by the IC engine intake. The system maintains the set-point by opening or closing a valve to the IC engine intake thereby increasing or decreasing the vacuum to the reaction zones 15 of the gasifier.

The processing of material by way of the gasifier system of the present invention will be discussed in more detail below.

Solids Flow:

1. Drilling cuttings 3 are introduced to the top of the gasifier 70 via inlet 12 using high pressure extrusion equipment commercially available from companies such as SEEPEX GMBH (or other system as discussed above). The key function of this part of the process is to provide fine volume and flow control while delivering the materials to the inlet 12 of the reactor 70 under oxygen free conditions. This process is also backed by a N2 blanketing system 13 as known in the art.

2. At the inlet 12, the cuttings 3 drop through material transfer channel 31 onto the top of the rotating disk 52 below where the protruding scraper elements 54 force the material into contact with directing elements 56 which act to force the material towards the center of disk and the interior transfer holes 58 where it drops through to the top surface of the flue gas plate below. The rotating paddles 59 of the disk then force the material along the top surface of the flue gas plate radially outwards towards the outer circumference and the next material transfer channel 31. At the required interval, based on needed retention times, the cuttings are allowed to drop through channel 31 onto the next plate. Retention time can be controlled in two ways—the speed of the disk rotation and the resulting dump, and the amount of material fed into the system. By rotating the disk slower the outer paddle will 'dump' less material simply by completing fewer passes along the dump port (channel 31). As well, for those systems equipped with an ejection paddle 61, each section has a tray function and has a fixed amount of material retained behind the 2-2.5" (5-6.35 cm) exit barrier 63 (the depth of the barrier can be altered to suit certain applications. MSW, for example, may have a deeper layer requiring, say a 3" (7.62 cm) barrier—forming a level.) If no additional material is added, this barrier holds the 2.5" level in each section/tray indefinitely. Once more material is added from the top, each 'tray' effectively is slowly overfilled and material coming into the middle of the tray causes the level to rise in this tray and the paddles then eject the outermost materials (which have been retained the longest) over the 2.5" barrier down to the section below. Using either method, this 'hand-off' is continued from section to section until the material reaches the lowest section of the gasifier and at the desired target temperature—in the case of drill cuttings, between 700-1400 F. By controlling the rotational speed of the conveying system and by adjusting the amount of material introduced at the top of the gasifier, the retention time is adjusted as needed to achieve this final target temperature.

3. Upon reaching the bottom of the gasifier, the cuttings are clean and hydrocarbon free. All organic content has been removed and the drill cuttings exit via a N2 purged dual stage air-lock 74 as known in the art.

4. From the airlock the cuttings are received into an dry screw conveyor or an air or water cooled and sealed auger system 76—also with a N2 blanket or other removal means such as a wet slurry venturi where slurry is circulated under the airlock and as the material drops into the opening it is mixed, cooled and transported via the fluid. In this outlet system the sterilized mineral materials are cooled and additional water is reintroduced to limit dust or the material could be sent to a dryer and then to a dry density separation table where a density sort takes place. Alternately the material is removed from the airlock in dry form and is conveyed via a jacketed and air-cooled screw auger to a screen deck which removes the larger fractions and then onto a dry density separation table where the materials are separated according to differences in specific gravity. In the case of drill cuttings, the barite could be separated off. In the case of MSW, the glass, metals etc could be separated. This mixed material is then sent to the disposal pit on site or for further processing as necessary; for example for Barite removal and recovery. The barite removal process could involve the use of wet density separation system; wet slurry process where the dry material is diluted into a slurry with water, is screened to remove larger particles, sent to a hydrocyclone to remove sand, sent to a centrifugal separator to sort the barite from the other minerals and then sent to a dryer to remove excess moisture before being sent for reuse.

Vapor Flow:

1. All hydrocarbons present in the infeed materials 3 are volatized in the gasification chambers 68, 70. These vapors are drawn off at each individual reaction section (reaction zones 15) to prevent the hydrocarbons from re-condensing before entering the individual venturi condensing sections and then into the combined settling and cooling system.

2. The volatized hydrocarbons are removed from each section under a slight vacuum provided by commercially available venturi condensing equipment or via the use of individual fin/fan condensers with the vacuum supplied by a separate vacuum pump or by the intake section to the IC engine and then fed to a common and combined settling and cooling system. The non condensable gasses are removed and sent, for example via conduit 77, directly to the engine and electrical generator 62. Under most operating conditions the condensable volatiles in collecting tower 78 will go to the condensing loop 80 and will be cooled and collected into a liquid storage tank 82. This liquid can then be used for start-up and operation of the IC engine and generator system or can be re-purposed as needed. This condenser 80 is sized to carry the full flow and capacity of the system.

Energy In—Exhaust Gas Flow:

1. The exhaust gasses from the generator 62 (that would normally vent to atmosphere) are introduced to the hollow plates 16 in the gasifier through an insulated ducting system as shown in the Figures and discussed above.

2. The gasses pass upward through the successive hollow heating plates 16 moving from the bottom of the gasifier to an exit at the top. If there are multiple gasifier stacks, the gasses are then transferred to a further electrical temperature booster, if necessary, (supplied commercially by companies such as Chromalox) and then into a second (or more) reactors. Upon final exhaust the gasses are used to preheat the material being introduced to the plant (in the in-feed hopper as discussed above).

3. Finally, the cooled exhaust is vented to the atmosphere. Preferably, the vent is the top perimeter of the in-feed hopper which has a double wall to serve as both a 'stack' and a heat exchange surface.

Processing drill cuttings by the present invention has a number of environmental and economic benefits when compared to the alternatives. The system offers a reduced cost of managing cuttings providing an 'At the Rig' solution. Transportation costs and associated pollution and infrastructure costs are eliminated by removing the need to transport large amounts of material to and from the source site. The process also eliminates the long term liability and cost of land filling or land-farming—a significant liability to the oil and gas industry. The process is extremely energy efficient and produces excess energy. The availability of excess energy means that less diesel fuel is required on site at remote drill site locations to generate power with consequent savings on the unneeded diesel fuel and the reduction of the associated trucking costs normally associated with delivery of diesel fuel to site. Also, if used as a drilling lubricant (which is what it was used for originally), it allows for the recycle of this liquid which eliminates up to 75% of new diesel that would have to be refined, hauled, and then used at the rig. In addition, currently approximately 25-50% of the Barite used for weighting the drill fluid is also sent to landfill. The present invention includes a process that would effectively recycle the Barite as well.

While the present invention has been discussed with reference to drill cuttings, it is also contemplated that the gasifier system could be used to process other materials, such as any organic carbon/hydrogen based substance that would undergo a phase change (solid to vapor) when exposed to temperatures up to 1400 F. Other possible waste materials for processing by the system of the present invention include hydrocarbons, hydrocarbon wastes, animal waste and byproducts, MSW/commercial garbage, crop waste, various fuel crops, bitumen, bitumen tailings, tank bottoms, etc).

It will be appreciated by those skilled in the art that the preferred and alternative embodiments have been described in some detail but that certain modifications may be practiced without departing from the principles of the invention.

What is claimed is:

1. A method for processing waste feedstock comprising:
   introducing said waste feedstock into a gasifier having a top, bottom and sides forming an enclosure;
   passing hot exhaust through a plurality of sealed-hollow heating plates stacked vertically within said gasifier, each heating plate having a top surface and a bottom surface and an outer wall, with spaces between each set of successive heating plates forming reaction zones;
   conveying said waste feedstock through said reaction zones, starting from said top of said gasifier and exiting from an exit in the bottom of said gasifier;
   wherein each reaction zone between a pair of heating plates comprising an upper treatment area and a lower treatment area, and said waste feedstock being conveyed through said upper and lower treatment areas to a next reaction zone or to said exit;
   wherein vapors from said waste feedstock are drawn off through an outlet for further processing; and
   wherein said exhaust first entering a lowermost one of said plurality of hollow heating plates and moving progressively upwards through successive hollow heating plates in said gasifier until exiting through an uppermost one of said plurality of hollow heating plates.

2. The method of claim 1 wherein said waste feedstock enters through an inlet in said top of said gasifier.

3. The method of claim 2 wherein said exit being an exit.

4. The method of claim 1 wherein said waste feedstock being introduced into said gasifier has had entrained air removed from said waste feedstock.

5. The method of claim 4 wherein said waste feedstock exiting said gasifier under oxygen free environment.

6. The method of claim 5 wherein said reaction zones operating under oxygen free environment.

7. The method of claim 1 wherein said vapors are drawn off from each reaction zone, each reaction zone having a respective outlet.

8. The method of claim 1 wherein said plurality of hollow heating plates being in fluid communication with one another to provide for exhaust flow through said plurality of hollow heating plates.

9. The method of claim 1 wherein said upper treatment area being separated from said lower treatment area by a rotatable disk.

10. The method of claim 9 wherein said waste feedstock is conveyed radially inwardly in said upper treatment area and radially outwardly in said lower treatment area.

11. The method of claim 10 wherein, in said upper treatment area, said waste material travels from an outer feed spot along a top surface of said rotating disk radially inwardly to a drop area located at a radially innermost portion of said disk where it enters said lower treatment area when it drops through said drop area to said top surface of the hollow heating plate below and is conveyed radially outwardly along said top surface of said hollow heating plate.

12. The method of claim 11 wherein the distance between said top surface of said rotating disk and the bottom surface of the hollow heating plate above it being smaller than the distance between a bottom surface of said disk and the top surface of the hollow heating plate below it.

13. The method of claim 1 wherein said hot exhaust is from an engine or turbine.

14. The method of claim 13 wherein said vapors are processed and input as a fuel into said engine or turbine.

15. The method of claim 13 wherein said engine or turbine generates electricity, said electricity powering an electric booster which heats said hot exhaust to a desired temperature prior to entering said gasifier.

16. The method of claim 1 further comprising temperature and depth sensors within each reaction zone.

17. The method of claim 16 wherein a control system monitors the temperature and depth sensors and controls the input temperature of the exhaust and the residence time of the waste material.

18. A process for treating a waste feedstock using a gasifier comprising:
 introducing a heat source into a gasifier to provide indirect heat to a waste feedstock;
 forcing said heat source through a series of hollow heating plates stacked vertically within said gasifier with spaces between each set of successive heating plates forming reaction zones, each reaction zone having dual treatment areas;
 introducing a waste feedstock into said gasifier through an inlet in a top of said gasifier;
 said waste feedstock being conveyed downward through the dual treatment areas of successive reaction zones to an exit located at a bottom of said gasifier;
 vapors from said waste feedstock exiting said gasifier through an outlet; and
 wherein said heat source enters the lowermost of said heating plates and travels upwards through successive heating plates thereby travelling counterflow to the direction of travel of said waste material.

19. The process of claim 18 wherein said heat source being hot exhaust from an engine or a turbine or other waste heat source, or produced vapors from the gasifier that are subjected to mechanical vapour recompression, all of which may be further heated using an electric element trim feature to control the temperature of the heat source.

20. The process of claim 19 wherein said vapors from said waste feedstock being drawn off each reaction zone.

21. The process of claim 18 further comprising a rotating disk in each reaction zone forming said dual treatment areas.

22. The process of claim 21 wherein said dual treatment areas comprising an upper treatment area above said disk and a lower treatment area below said disk.

23. The process of claim 22 wherein said upper treatment area being shallower in height than said lower treatment area.

24. The process of claim 22, wherein when in said upper treatment area, said waste material travels from an outer feed spot along the top surface of the rotating disk radially inwardly to a drop area located at the radially innermost portion where it drops to the top surface of the hollow heating plate below thereby entering the lower treatment area.

25. The process of claim 24 wherein when in said lower treatment area, said waste material being conveyed radially outwardly to a chute to the next reaction zone or once fully processed to said exit.

26. The process of claim 25 wherein said heat source traveling through said heating plate from an outer circumference radially inwardly, counterflow to the direction of travel of said waste material on the top surface of the heating plate.

27. The process of claim 18 further comprising a second gasifier, said heat source exiting said heating plates of said gasifier and being directed to said second gasifier.

28. The process of claim 27, wherein prior to entering said second gasifier, said heat source being heated to a desired temperature.

29. The process of claim 28 wherein said heat source being heated by an electric booster.

30. The process of claim 27 wherein said waste material introduced into said gasifier being delivered from an exit from said second gasifier.

31. The process of claim 30 further comprising a storage container for storing said waste feedstock, said storage container having a double wall through which said heat source is directed upon exiting said second gasifier.

32. The process of claim 31, further comprising a feed system for delivering said waste feedstock from said storage container to said second gasifier under oxygen free environment.

* * * * *